(12) United States Patent
Kawamura

(10) Patent No.: US 7,637,817 B2
(45) Date of Patent: Dec. 29, 2009

(54) INFORMATION PROCESSING DEVICE, GAME DEVICE, IMAGE GENERATION METHOD, AND GAME IMAGE GENERATION METHOD

(75) Inventor: Mitsuru Kawamura, Tokyo (JP)

(73) Assignee: Sega Corporation, Tokyo (JP)

( * ) Notice: Subject to any disclaimer, the term of this patent is extended or adjusted under 35 U.S.C. 154(b) by 451 days.

(21) Appl. No.: 11/018,477

(22) Filed: Dec. 22, 2004

(65) Prior Publication Data
US 2005/0202870 A1 Sep. 15, 2005

(30) Foreign Application Priority Data
Dec. 26, 2003 (JP) ............................. 2003-434306

(51) Int. Cl.
*A63F 13/00* (2006.01)
(52) U.S. Cl. .............................. 463/51; 463/32; 463/50; 273/317.1; 273/348; 345/157; 345/419; 345/619; 715/757; 715/764
(58) Field of Classification Search ................ 463/1–5, 463/7–8, 30–34, 36–39, 49–57, 40–43; 273/317.1, 273/340, 348, 361–367, 108.1, 127 R, 148 R, 273/309, 148 B; 345/1.1–3.4, 156, 157, 345/160, 419, 473–475, 618–619, 629; 717/168–178; 348/37, 119, 141–142, 240.99, E13.022–E13.027, 348/E13.036; 434/115, 117, 118, 211; 715/706, 715/738, 757, 762–764; *A63F 13/00, 13/06, A63F 13/10*
See application file for complete search history.

(56) References Cited

U.S. PATENT DOCUMENTS

| 4,395,045 | A | * | 7/1983 | Baer ............................. 463/5 |
| 4,754,133 | A | * | 6/1988 | Bleich .......................... 250/221 |
| 4,813,682 | A | * | 3/1989 | Okada ........................... 463/5 |
| 4,844,476 | A | * | 7/1989 | Becker .......................... 463/5 |
| 5,009,501 | A | * | 4/1991 | Fenner et al. ............. 356/141.3 |
| 5,351,969 | A | | 10/1994 | Smith, III et al. |
| 5,366,229 | A | * | 11/1994 | Suzuki .......................... 463/5 |

(Continued)

FOREIGN PATENT DOCUMENTS

EP 1 287 864 A2 3/2003

(Continued)

*Primary Examiner*—Peter DungBa Vo
*Assistant Examiner*—Arthur O. Hall
(74) *Attorney, Agent, or Firm*—Finnegan, Henderson, Farabow, Garrett, Dunner, L.L.P.

(57) ABSTRACT

Provided is technology enabling the generation of images of high realistic sensation upon accurately reflecting the operator's behavior. The information processing device has a controller to be used for inputting an operational instruction, and having a function of outputting a detectable wave to be used for detecting its own position and direction; a plurality of sensors for detecting the intensity of the detectable wave transmitted from the controller at mutually different positions; a position/direction calculation unit for calculating the position and direction of the controller in a real space based on the ratio of the intensity of the detectable wave detected with each of the plurality of sensors; an image generation unit for generating an image reflecting the operational instruction input with the controller, and the position and direction of the controller calculated with the position/direction calculation unit; and a display unit for displaying the image generated with the image generation unit.

22 Claims, 14 Drawing Sheets

U.S. PATENT DOCUMENTS

| | | | |
|---|---|---|---|
| 5,401,025 A | | 3/1995 | Smith, III et al. |
| 5,590,062 A | * | 12/1996 | Nagamitsu et al. ............. 703/6 |
| 5,644,126 A | * | 7/1997 | Ogawa .................... 250/231.1 |
| 5,734,807 A | * | 3/1998 | Sumi ......................... 345/427 |
| 5,926,168 A | * | 7/1999 | Fan ............................ 345/158 |
| 6,012,980 A | * | 1/2000 | Yoshida et al. ................. 463/2 |
| 6,184,863 B1 | * | 2/2001 | Sibert et al. ................. 345/156 |
| 6,206,783 B1 | * | 3/2001 | Yamamoto et al. ............ 463/36 |
| 6,278,418 B1 | | 8/2001 | Doi |
| 6,287,198 B1 | * | 9/2001 | McCauley ................... 463/37 |
| 6,452,585 B1 | | 9/2002 | Horton et al. |
| 6,567,071 B1 | * | 5/2003 | Curran et al. ............... 345/158 |
| 6,750,848 B1 | * | 6/2004 | Pryor ......................... 345/168 |
| 6,766,036 B1 | * | 7/2004 | Pryor ......................... 382/103 |
| 6,852,032 B2 | * | 2/2005 | Ishino ......................... 463/30 |
| 6,962,532 B2 | * | 11/2005 | Hasebe et al. ................. 463/51 |
| 7,140,962 B2 | * | 11/2006 | Okuda et al. .................... 463/2 |
| 2002/0010021 A1 | | 1/2002 | McCauley |
| 2002/0160840 A1 | * | 10/2002 | Morkris et al. ................ 463/51 |
| 2003/0160783 A1 | * | 8/2003 | Saikawa et al. ............. 345/419 |
| 2003/0199324 A1 | * | 10/2003 | Wang .......................... 463/51 |
| 2003/0199325 A1 | * | 10/2003 | Wang .......................... 463/51 |
| 2004/0109000 A1 | * | 6/2004 | Chosokabe ................. 345/426 |

FOREIGN PATENT DOCUMENTS

| | | |
|---|---|---|
| EP | 1 287 864 A3 | 3/2003 |
| JP | 2713603 B | 2/1998 |
| JP | 11-086038 | 3/1999 |
| JP | 3150153 B | 3/2001 |
| JP | 2001-321564 A | 11/2001 |
| JP | 2002-233665 A | 8/2002 |

* cited by examiner

INFORMATION PROCESSING DEVICE, GAME DEVICE, IMAGE GENERATION METHOD, AND GAME IMAGE GENERATION METHOD

CROSS-REFERENCES

The entire disclosure of Japanese Patent Application No. 2003-434306 filed on Dec. 26, 2003 including specification, claims, drawings and summary are incorporated herein by reference in its entirety.

BACKGROUND OF THE INVENTION

1. Field of the Invention

The present invention pertains to image processing technology suitable for game devices and various simulators (virtual reality devices) that conduct three-dimensional (3D) image display.

2. Description of the Related Art

A game device for shooting a target character (e.g., an enemy such as a person) appearing on the screen with a gun-shaped controller having a shape imitating a gun is conventionally known. With this kind of shooting game device, it is important to accurately understand where the player is aiming on the screen with the gun-shaped controller. For example, Japanese Patent Laid-Open Publication No. H11-86038 discloses technology for calculating which position (XY coordinates) the muzzle of the gun-shaped controller is aiming on the screen, wherein an infrared light emission unit is disposed to a plurality of locations around the monitor for displaying the game image and a light-reception unit is provided on the gun-shaped controller side, each of the foregoing light emission units is lit up in order and the quantity of light is detected with the light-reception unit in order, and the detection result thereof is used for such calculation.

With the foregoing conventional technology, only the two-dimensional position on the screen is calculated, and no consideration is given regarding from where and how the player (operator) is aiming at the position on the screen. As a result, in a shooting game where enemy characters are disposed in the three-dimensional virtual space (game space), and the image (so-called three-dimensional display image) viewed from the virtual viewpoint inside this virtual space is displayed, there are cases where unnatural processing is performed. For instance, when an enemy character is lurking in the shadows inside the game space, which should impossible to hit, and such enemy character is visible in the game image and the muzzle is pointed at that position, there are cases where this enemy character can be shot down, and this would impair the realistic sensation.

Thus, an object of the present invention is to provide technology enabling the generation of images of high realistic sensation upon accurately reflecting the operator's behavior.

SUMMARY OF THE INVENTION

In order to achieve the foregoing object, the information processing device according to the present invention comprises: an operational means (controller) to be used for inputting an operational instruction, and having a function of outputting a detectable wave to be used for detecting its own position and direction; a plurality of detection means (sensors) for detecting the intensity of the detectable wave transmitted from the operational means at mutually different positions; a position/direction calculation means for calculating the position and direction of the operational means in a real space based on the ratio of the intensity of the detectable wave detected with each of the plurality of detection means; an image generation means for generating an image reflecting the operational instruction input with the operational means, and the position and direction of the operational means calculated with the position/direction calculation means; and a display means for displaying the image generated with the image generation means.

According to the foregoing constitution, since the position and direction of the operational means in the real space is calculated and the calculation result thereof is reflected in the generation of images, it is possible to generate images of high realistic sensation by accurately reflecting how the operator is operating the operational means; in other words, by reflecting the operator's behavior.

Here, the term "operational means (controller)" as used in this specification refers to a controller to be held or worn by the operator, and, although there is no limitation on the shape thereof, it is preferable that such controller is formed in a shape associated with the image generated with the image generation means. As this kind of operational means, for example, there is a gun-shaped controller having a shape imitating various types of guns (pistol, rifle, laser gun, etc.). Further, the term "detectable wave" as used in this specification is used for detecting the location of the operational means in the real space, and, although there is no limitation on the content thereof, an electromagnetic wave or sound wave can be preferably employed.

Preferably, each of the foregoing plurality of detection means is disposed around the screen of the display means. Moreover, when the screen of the display unit is of an approximate quadrilateral, it is preferable that each of the foregoing detection means is disposed in the vicinity of the four corners of such approximate quadrilateral screen.

In many cases, since the operator inputs operational instructions with the operational means while facing the screen of the display means and viewing the image displayed on such screen, as a result of disposing the respective detection means around the screen (particularly in the vicinity of the four corners), the detectable wave transmitted from the operational means can be detected with high sensitivity, and the calculation accuracy of the position and the like can be improved thereby.

Further, preferably, each of the foregoing detection means has three detector planes (sensor planes) disposed toward three mutually different positions. Specifically, it is preferable that the three detector planes are disposed toward three mutually perpendicular directions (X, Y, Z directions).

As a result, since the direction vector from each of the detection means to the operational means can be sought, the position and direction of the operational means can be calculated with high accuracy by performing the computation of synthesizing the direction vectors.

Moreover, each of the foregoing detection means may have one detector plane.

In such a case, the position and direction of the operational means can be calculated from the ratio of the amount of light received in each detector plane, and there is an advantage in that the computational quantity required for the calculation of the position or the like can be reduced, and the constitution of the detection means can be simplified.

Further, it is preferable to use infrared light as the detectable wave to be transmitted from the operational means.

As a result, peripheral light (visible light) and the detectable wave can be identified reliably, and deterioration in the detection accuracy caused by the generation of noise from the peripheral light can be prevented.

Moreover, preferably, the operational means is further provided with a detectable wave control means for changing the state of the detectable wave according to the content of the operational instruction; and the position/direction calculation means determines the content of the operational instruction based on the state of the detectable wave detected with the detection means, and outputs the content of the operational instruction to the image generation means.

Accordingly, as a result of overlapping the content of the operational instruction with the detectable wave, if it is not necessary to otherwise transfer a signal or the like between the operational means and image generation means, there will be no need to provide a connection cable or the like between the operational means and image generation means, and the constitution can be simplified thereby. In addition, the operational means can be made wireless, and the operability can be improved.

Preferably, the image generation means generates a two-dimensional image viewed from a virtual viewpoint in a virtual space by disposing an object in the virtual space, and changing the state of the object according to the position and direction of the operational means.

As a result, a three-dimensional display of high realistic sensation is enabled.

Here, the term "object" as used in this specification refers to the various objects to be disposed in the virtually set space (virtual space), and, although there is no limitation on the content thereof, various items such as human or animal characters, objects such as obstacles or buildings, or elements constituting the background and so on may be employed.

Further, preferably, the image generation means generates a two-dimensional image viewed from a virtual viewpoint in a virtual space by disposing an object in the virtual space, and changes the position and (or) visual direction of the virtual viewpoint according to the position and direction of the controller.

As a result, it is possible to generate an image setting the viewpoint at a position conforming to the operator's behavior, and the realistic sensation can be further improved thereby.

As the foregoing operational means, for instance, a gun-shaped controller having a shape imitating a gun can be preferably employed.

This gun-shaped controller is in particular preferable upon constituting a shooting game (gun game) or a shooting simulator with the information processing device according to the present invention, and image display reflecting movements unique to the use of guns can be realized.

Moreover, when employing a gun-shaped controller as the operational means, it is preferable that the image generation means generates a two-dimensional image containing the trajectory of the bullet virtually fired with the operational means according to the calculation result of the position/direction calculation means.

In the present invention, not only can the two-dimensional coordinates on the screen aimed with the gun-shaped controller be understood, from what position and toward which direction the gun-shaped controller is facing in relation to the screen can also be understood. Thus, a highly realistic image expression reflecting the relative position and direction with the controller and the object in the virtual space can be realized, and the realistic sensation can be improved even further.

Further, when using a gun-shaped controller, preferably, the image generation means employs the calculation result of the position/direction calculation means to determine whether a bullet virtually fired from the operational means hit an object in the virtual space, and generates the two-dimensional image according to the determination result.

As a result of adding the element of position and direction of the gun-shaped controller, the determination of hit or miss can be made more accurately (i.e., in a realistic state), and the realistic sensation of the displayed image can be improved even further.

Moreover, as the foregoing operational means, it is also preferable to use a sword-shaped controller having a shape imitating various types of swords (knife, saber, etc.). In addition, it is also preferable to form the foregoing operational means in various shapes associated with the displayed image; for instance, in the shape of a tennis racket, a table tennis paddle, a baseball bat, and so on.

Further, when a plurality of operational means is provided, preferably, the position/direction calculation means transmits an identifying signal for selecting one among the plurality of operational means in each prescribed timing (e.g., each 0.02 seconds) and identifying the selected operational means; and the detectable wave control means provided to each of the plurality of operational means outputs the detectable wave based on the identifying signal when its own operational means is being selected.

As a result, even when using a plurality of operational means, the one operational means subject to the calculation of the position and direction thereof can be reliably specified in each prescribed timing. As a result of giving consideration to the operable speed of the operator and suitably setting the time to be assigned to the respective operational means, each of the plurality of operators using the respective operational means will not experience any sense of discomfort.

Preferably, the identifying signal is transmitted to a detectable wave control unit via wireless communication.

As a result, there will be no need to provide a connection cable or the like for sending the identifying signal between the operational means and position/direction calculation means, and the constitution can be simplified thereby. In addition, if it is not necessary to otherwise provide a connection cable or the like for transferring another signal, the operational means can be made wireless, and the operability can be improved.

Preferably, the detectable wave control means controls the characteristics of the detectable wave such that the self-transmitted the detectable wave and the detectable wave employed in other devices are mutually identifiable; and the position/direction calculation means identifies the operational means employed in its own device by determining the characteristics of the detectable wave from the detection result of the sensor. In addition, as the characteristics of the detectable wave, it is preferable to control the frequency of the detectable wave.

As a result, even when a plurality of information processing devices according to the present invention is disposed in close proximity, the operational means corresponding to the respective devices can be easily identified among such plurality of information processing devices.

Moreover, the present invention is also a game device constituted by including the foregoing information processing device. For example, it is preferable to use the foregoing information processing device to constitute a shooting game or the like. As a result, a game device full of realistic sensation can be provided.

Further, the present invention is also a simulator constituted by including the foregoing information processing device. Here, the term "simulator" as used in this specification refers to a virtual reality device capable of making the operator experience virtual reality of various circumstances, and, although there is no limitation on the content thereof, various virtual reality devices may be considered; for instance, a device for simulating shooting, a device for simulating a battle with a sword, a device for simulating fire fighting by a firefighter (here, a fire hose-shaped controller is preferable), among others.

As a result of employing the information processing device according to the present invention, a simulator enabling a virtual reality experience with high realistic sensation can be provided.

Moreover, the present invention is a game device which detects the relative positional relationship of the display means for displaying a game image viewable from the position and direction of a virtual viewpoint in a virtual space and the operational means operated by a player, and advances the game based on the detected positional relationship, the game device comprising: a position detection means for detecting the position of the longitudinal direction and lateral direction of the operational means in relation to the display surface of the display means; an orientation detection means for detecting the orientation of the operational means in relation to the display surface; a position/direction calculation means for calculating the operational position and operational direction of the operational means based on the detection information obtained respectively from the position detection means and the orientation direction means; and an image generation means for calculating the position of the virtual viewpoint based on the operational position calculated with the position/direction calculation means, calculating the visual direction of the virtual viewpoint based on the operational direction calculated with the position/direction calculation means, and generating a game image based on the viewpoint position and the visual direction.

According to the foregoing constitution, since the relative position and direction of the display means and operational means in the real space is calculated and the calculation result thereof is reflected in the generation of images, it is possible to generate game images of high realistic sensation by accurately reflecting how the operator is operating the operational means; in other words, by reflecting the operator's behavior.

Further, the present invention is an image generation method which detects the relative positional relationship of the display means for displaying a game image viewable from the position and direction of a virtual viewpoint in a virtual space and the operational means operated by a player, and generates an image based on the detected positional relationship, the image generation method comprising: a first step of the detection means detecting the intensity of a detectable wave transmitted from the operational means at a plurality of mutually different positions; a second step of the position/direction calculation means calculating the position and direction of the operational means in a real space based on the ratio of the intensity of the detectable wave detected at the first step; and a third step of the image generation means generating a two-dimensional image reflecting the operational instruction input with the operational means, and the position and direction of the operational means calculated at the second step.

Since the position and direction of the operational means (controller) in the real space is calculated and the calculation result thereof is reflected in the generation of images, it is possible to generate images of high realistic sensation by accurately reflecting how the operator is operating the operational means; in other words, by reflecting the operator's behavior.

Preferably, the first step detects the intensity of the detectable wave in three mutually different directions in each of the plurality of positions; and the second step seeks the direction vector from the intensity of the detectable wave in the three directions regarding each of the plurality of positions, and calculates the position and direction of the operational means by synthesizing the direction vectors.

As a result, the position and direction of the operational means can be calculated with high accuracy.

Moreover, it is preferable to further comprise a fourth step of the detectable wave control means changing the state of the detectable wave so as to contain the content of the operational instruction input with the operational means.

As a result, the content of the operational instruction can be overlapped with the detectable wave.

Further, preferably, the third step generates a two-dimensional image viewed from a virtual viewpoint in a virtual space by disposing an object in the virtual space, and changing the state of the object, or changing the position and visual direction of the virtual viewpoint according to the calculation result at the second step.

As a result, a three-dimensional display of a high realistic sensation can be realized.

Moreover, preferably, the third step generates a two-dimensional image viewed from a virtual viewpoint in a virtual space by disposing an object in the virtual space, and changes the position of the virtual viewpoint according to the calculation result (position and direction of the controller) at the second step.

As a result, it is possible to generate an image setting the viewpoint at a position conforming to the operator's behavior, and the realistic sensation can be further improved thereby.

When a plurality of operational means is to be used, it is preferable to further comprise a fifth step of the position/direction calculation means transmitting an identifying signal for selecting one among the plurality of operational means in each prescribed timing and identifying the selected operational means; and a sixth step of the detectable wave control means transmitting the detectable signal only to the selected controller based on the identifying signal.

As a result, even when using a plurality of operational means, the one operational means subject to the calculation of the position and direction thereof can be reliably specified in each prescribed timing. In addition, as a result of giving consideration to the operable speed of the operator and suitably setting the time to be assigned to the respective operational means, each of the plurality of operators using the respective operational means will not experience and sense of discomfort.

Further, it is preferable to further comprise a seventh step of the detectable wave control means variably setting the characteristics of the detectable wave such that the controller to be the calculation target of the position and direction and other the controllers are identifiable; and an eighth step of the position/direction calculation means identifying the controller to be the calculation target of the position and direction by determining the characteristics of the detectable wave. As the characteristics of the detectable wave, the frequency of the detectable wave may be set variably.

As a result, even when a plurality of devices employing the image generation method according to the present invention is disposed in close proximity, the operational means corresponding to the respective devices can be easily identified among such plurality of information processing devices.

Moreover, the present invention is a game image generation method which detects the relative positional relationship of the display means for displaying a game image viewable from the position and direction of a virtual viewpoint in a virtual space and the operational means operated by a player, and generates a game image based on the detected positional relationship, the game image generation method comprising: a first step of the position detection means detecting the position of the longitudinal direction and lateral direction of the operational means in relation to the display surface of the display means; a second step of the orientation direction means detecting the orientation of the operational means in relation to the display surface; a third step of the position/direction calculation means calculating the operational position and operational direction of the operational means based on the detection result obtained at the first step and the second step; and a fourth step of the image generation means calculating the virtual viewpoint based on the operational position calculated at the third step, calculating the visual direction of the virtual viewpoint based on the operational direction calculated at the third step, and generating a game image based on the viewpoint position and the visual direction.

Since the position and direction of the operational means (controller) in the real space is calculated and the calculation result thereof is reflected in the generation of images, it is possible to generate images of high realistic sensation by accurately reflecting how the operator is operating the operational means; in other words, by reflecting the operator's behavior.

DETAILED DESCRIPTION OF THE PREFERRED EMBODIMENTS

Embodiments of the present invention are now explained with reference to the drawings.

Figure 1:
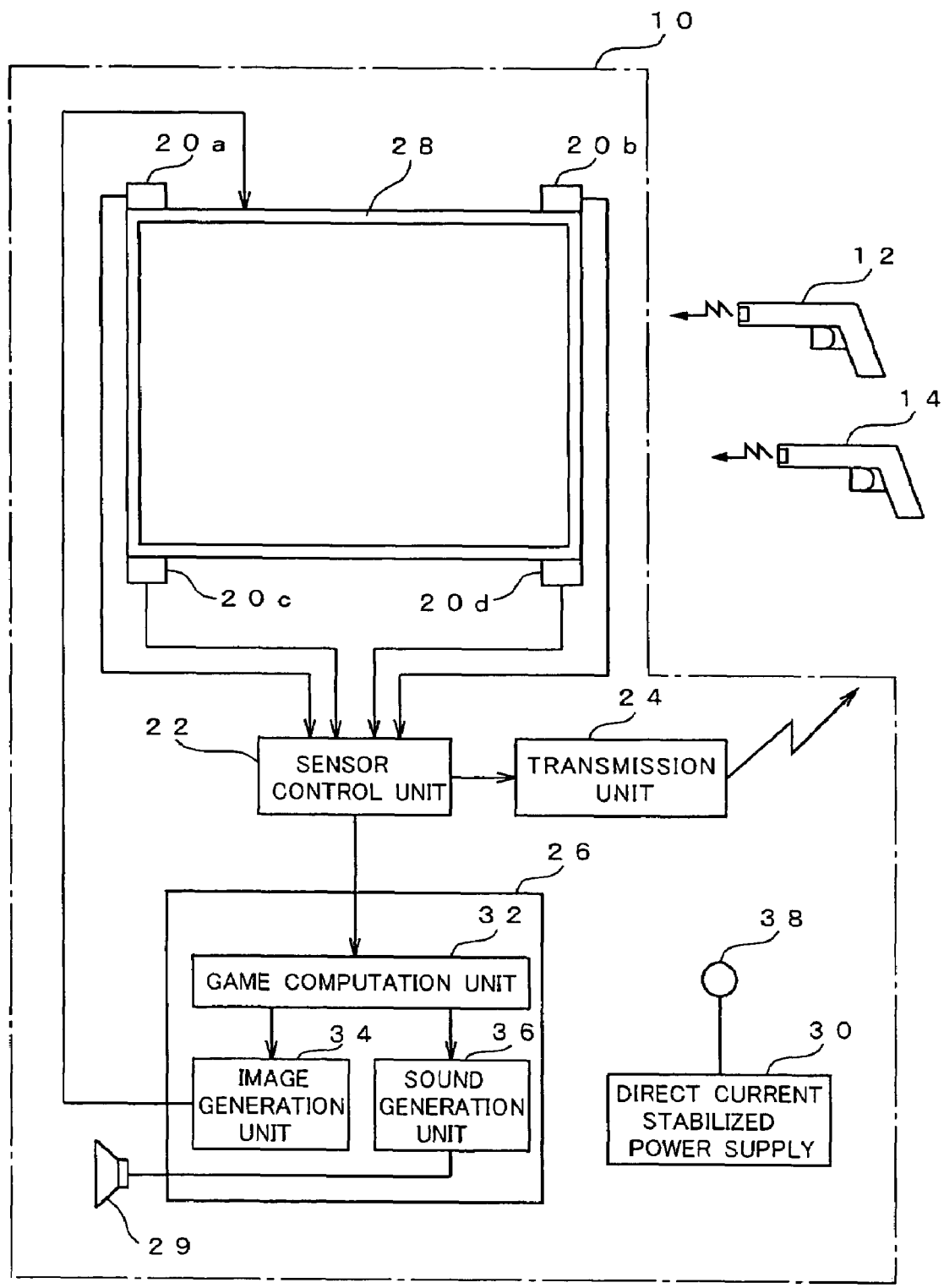
FIG. 1 is a diagram for explaining the constitution of the game device according to an embodiment employing the present invention.

FIG. 1 is a diagram for explaining the constitution of the game device according to an embodiment employing the present invention. The game device 1 shown in FIG. 1 is for up to two players (operators) to simultaneously play a shooting game while watching the game image displayed three-dimensionally on the screen, and is constituted by including a game device body 10 and two gun-shaped controllers 12, 14.

The gun-shaped controllers 12, 14 are operational means having a shape imitating the appearance of various types of guns (e.g., machine gun, pistol, rifle, shotgun, laser gun, etc.). The gun-shaped controller 12 is for a first player to input operations, and the gun-shaped controller 14 is for a second player to input operations. These gun-shaped controllers 12, 14 are wireless in which a connection cable is not provided between the game device body 10, and the player is able to freely operate such [controller] without being subject to any restraints regarding the operational area normally encountered with a connection cable. The transfer of signals and the like between the game device body 10 and the respective gun-shaped controllers 12, 14 is conducted via wireless communication. Incidentally, details on the constitution of the gun-shaped controllers 12, 14 will be described later.

The game device body 10 is constituted by including a plurality of sensors 20a to 20d, a sensor control unit 22, a transmission unit 24, a game control unit 26, a monitor 28, and a direct current stabilized power supply 30.

Each of the respective sensors 20a to 20d is disposed in the vicinity of the four corners of the screen of a monitor 28, detects the intensity of the detectable wave transmitted from one of the gun-shaped controllers 12, 14, and outputs the detection result to the sensor control unit 22. The respective sensors 20a to 20d in the present embodiment have sensor planes (detector planes) disposed toward three mutually different directions. Details regarding the disposition of the sensors 20a to 20d will be described later. These sensors 20a to 20d correspond to the "detection means".

The sensor control unit 22 calculates the position and direction of the gun-shaped controller 12 or 14 in the space based on the ratio of the intensity of the detectable wave detected respectively with the plurality of sensors 20a to 20d. Details regarding the calculation method of the position and direction with the sensor control unit 22 will be described later. Further, the sensor control unit 22 uses the transmission unit 24 to select one among the respective gun-shaped controllers 12, 14 in each prescribed timing, and transmits a prescribed identifying signal representing the selected gun-shaped controller. This identifying signal is transmitted with the transmission unit 24 via wireless communication. Each of the gun-shaped controllers 12, 14 transmits a detectable wave only when it is being selected based on the identifying signal. This sensor control unit 22 and each of the foregoing sensors 20a to 20d collaborate and function as the "position detection means" and "orientation direction means".

The game control unit 26 sets the game progress and generates a game image in correspondence with the content of the operational instruction input with the gun-shaped controllers 12, 14, and the position and direction of such gun-shaped controllers 12, 14, and contains the respective functional blocks of the game computation unit 32, image generation unit 34 and sound generation unit 36. Incidentally, this game control unit 26 corresponds to the "image generation means".

The game computation unit 32 is used for performing the various computations required in the game progress, and performs processing for setting the behavior of various objects (e.g., enemy character and the like) in the virtual space upon reflecting the operational instruction input with the gun-shaped controllers 12, 14 and the position and direction of the gun-shaped controllers 12, 14 calculated with the sensor control unit 22.

The image generation unit 34 generates a two-dimensional image (game image) viewed from a virtual viewpoint in the game space in correspondence with the computation result of the game computation unit 32.

The sound generation unit 36 generates various game sounds (e.g., explosion sounds and background music) required for the game progress in correspondence with the computation result of the game computation unit 32.

The monitor 28 displays the game image generated with the image generation unit 34 on a screen. Moreover, the monitor 28 has a built-in speaker not shown, and outputs the game sound generated with the sound generation unit 36. This monitor 28 corresponds to the "display means".

The direct current stabilized power supply 30 supplies power to the overall game device body 10, and charges the respective gun-shaped controllers 12, 14 via a charging terminal 38.

Figure 2:
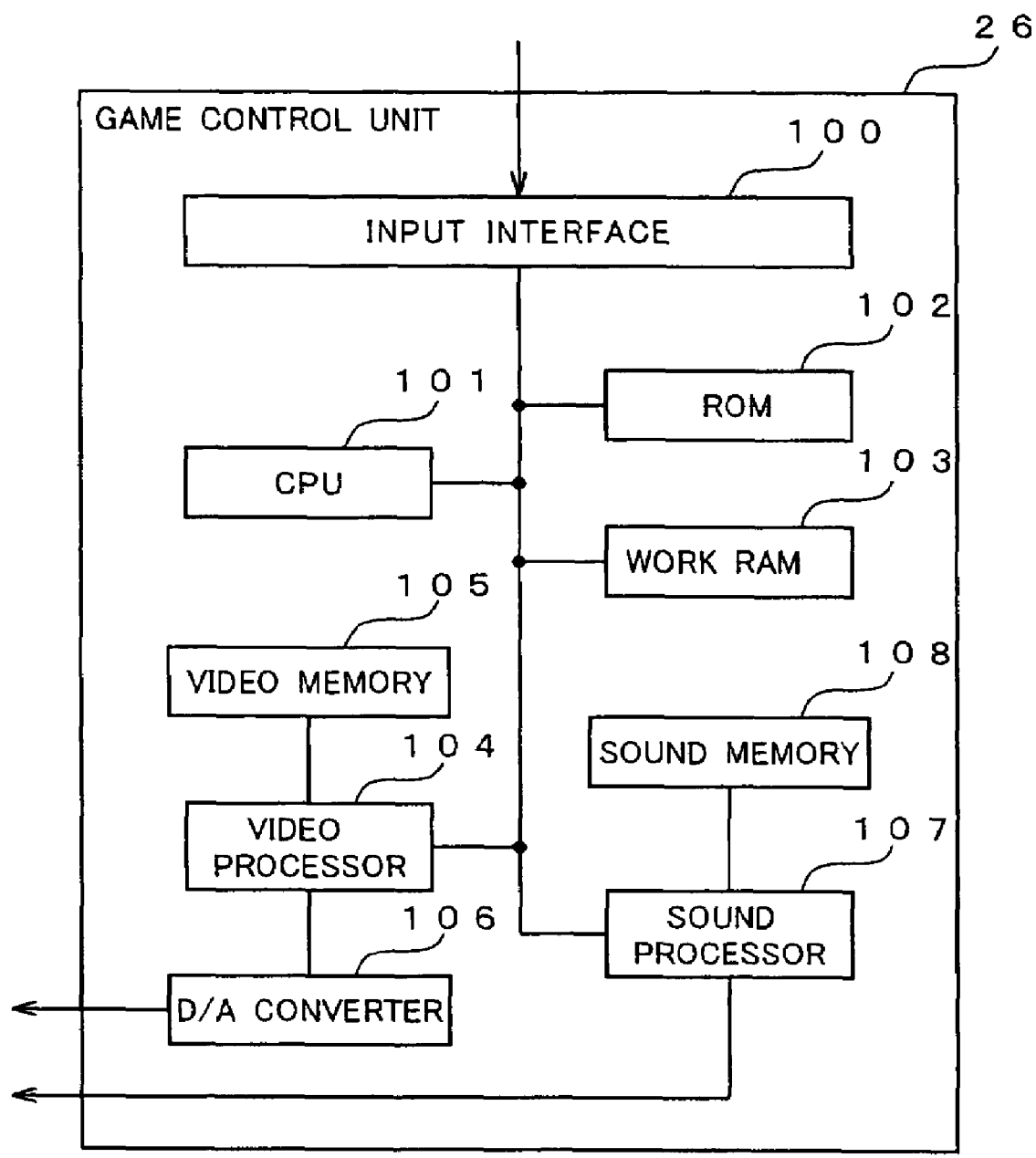
FIG. 2 is a diagram for explaining a specific example of the hardware constitution that realizes the game control unit.

FIG. 2 is a diagram for explaining a specific example of the hardware constitution that realizes the game control unit. The game control unit 26 shown in FIG. 2 is constituted by including an input interface 100, a CPU 101, a ROM 102, a work RAM 103, a video processor 104, a video memory 105, a digital/analog (D/A) converters 106, a sound processor 107, and a sound memory 108.

The input interface 100 receives information regarding the position and direction of, and the firing of bullets from, the respective gun-shaped controllers 12, 14 from the sensor control unit 22, and writes such information (data) in a prescribed address of the work RAM 103.

The CPU 101 executes the game program read out from the ROM 102 and written into the work RAM 103, and performs game computation for setting the game progress and so on. Moreover, the CPU 101 determines the coordinate value (coordinate value in the world coordinate system) of an object such as the various characters or structures in the game space according to the set game progress, and performs processing (projection conversion) for projecting this coordinate value in the coordinate value in a visual field coordinate system with a prescribed conversion matrix.

The ROM 102 stores the foregoing game program and various data (e.g., polygon data, texture data, etc.) used in the game computation. The work RAM 103 is a random access memory that functions as a work area for temporarily storing various data upon the CPU 101 performing game computation.

The video processor 104 laminates texture to the various objects converted into a visual field coordinate system and generates drawing data corresponding to the game image to be displayed in the subsequent frame, and writes this in the video memory 105. Further, the video processor 104 reads the drawing data corresponding to the game image to be displayed in the current frame and outputs this to the D/A converter 106. As a result of this drawing data being converted into an analog video signal with the D/A converter 106 and output to the monitor 28, a game image is displayed on the screen of the monitor 28.

The sound processor 107 generates sound data for providing sound effects corresponding to the game progress and writes this into the sound memory 108, and further reads sound data from the sound memory 108 as required and converts such sound data into an analog sound signal, and outputs this to the speaker 29. Game sound is output from the speaker 29 based on the foregoing sound signal.

Figure 3:
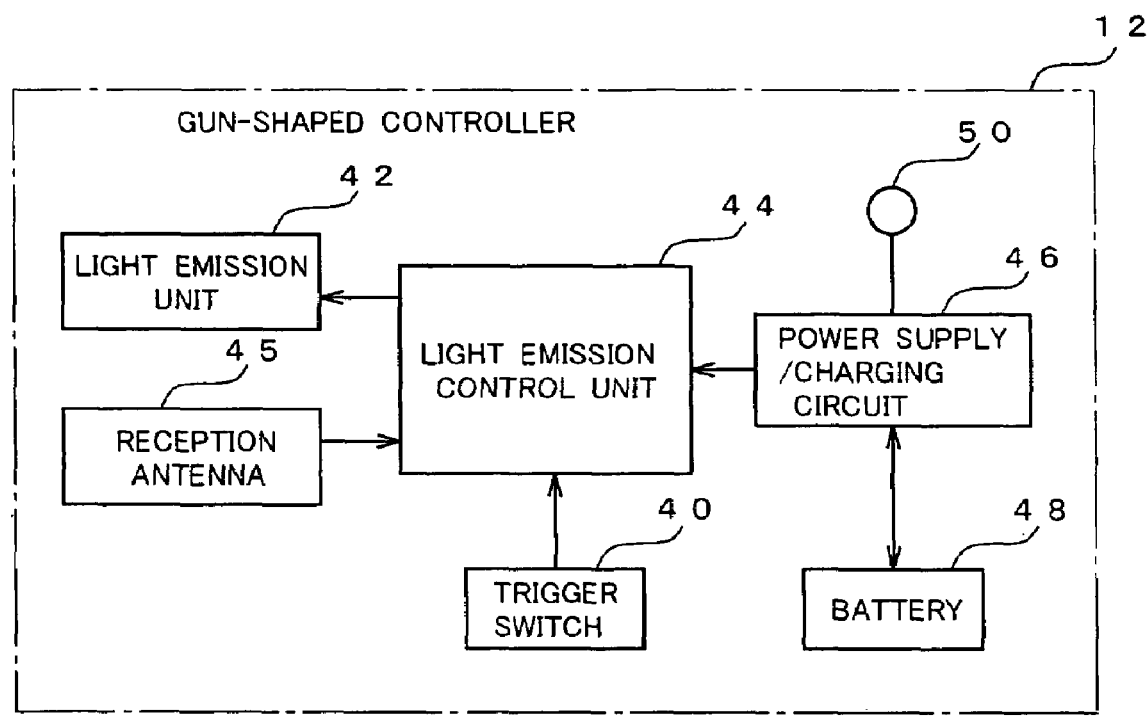
FIG. 3 is a diagram for explaining the detailed constitution of the gun-shaped controller.

FIG. 3 is a diagram for explaining the detailed constitution of the gun-shaped controller 12. Incidentally, the gun-shaped controller 14 has the same constitution and the explanation thereof is omitted. As shown in FIG. 3, the gun-shaped controller 12 has an operational unit 40, a light emission unit 42, a light emission control unit 44, a power supply/charging circuit 46, and a battery 48.

The operational unit 40 is used as the operational key (trigger switch) for the player to instruct the firing of bullets. Incidentally, as the operational unit 40, in addition to the operational key as the trigger switch, also employed may be a switch for instructing the change of weapons (weapon changing switch), a bullet loading switch (reloading switch), or the like.

The light emission unit 42 is disposed at the front part of the case of the gun-shaped controller 12; specifically, near the muzzle thereof, so as to enable the outward transmission of the detectable wave, and, upon being controlled with the light emission control unit 44, transmits the detectable wave. In the present embodiment, infrared light is used to transmit the detectable wave. Incidentally, in addition to infrared light, electromagnetic waves of various wavelengths such as visible light, or sound waves, may be used to transmit the detectable wave.

The light emission control unit 44 controls the operation of the light emission unit 42. Description of the specific control will be explained later. This light emission control unit 44 corresponds to the "detectable wave control unit".

The power supply/charging circuit 46 has a power supply circuit for supplying power to the overall gun-shaped controller 12 with the power accumulated in the battery 48, and a charging circuit for charging the battery 48 upon being externally supplied with power via the charging terminal 50.

The game device 1 of the present embodiment has the foregoing constitution, and the description of its operation is explained below.

Figure 4A:
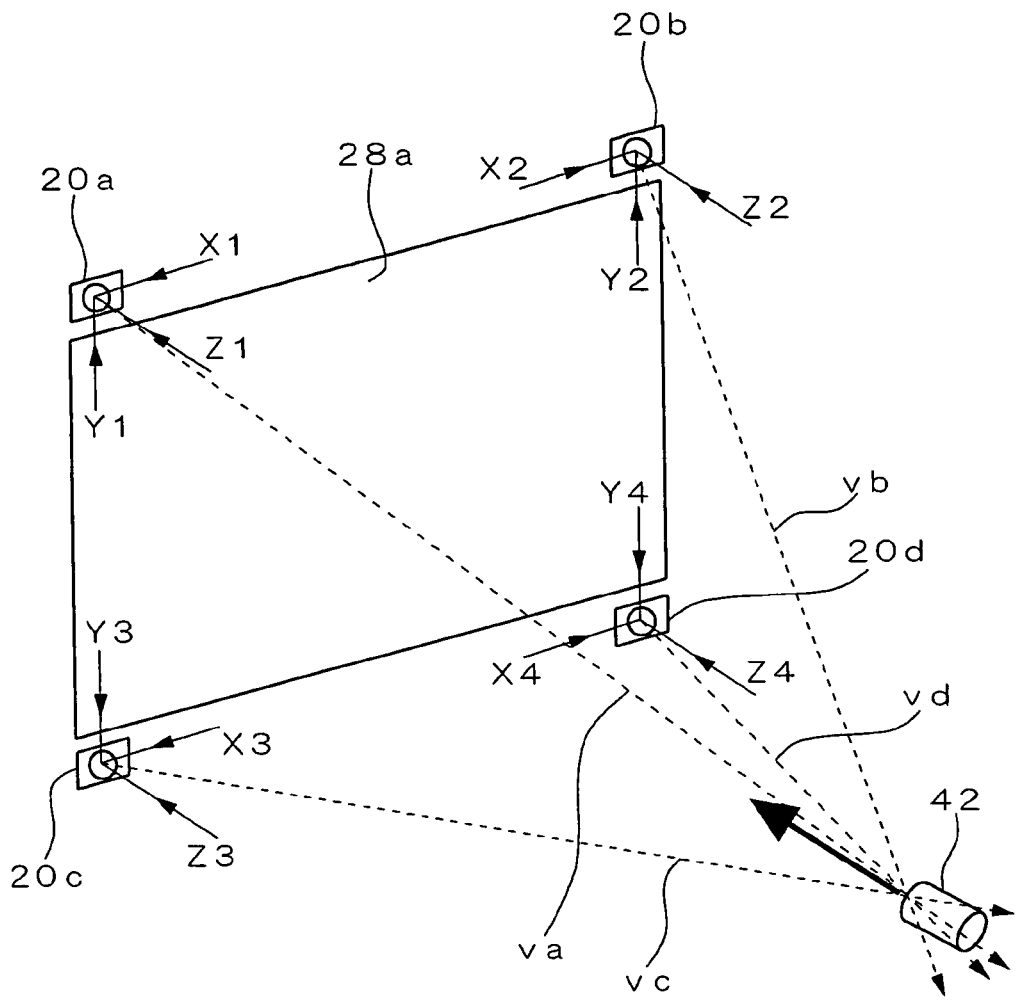
FIG. 4 (A) and FIG. 4 (B) are diagrams for explaining the calculation method of the position and direction of the gun-shaped controller.
Figure 4B:
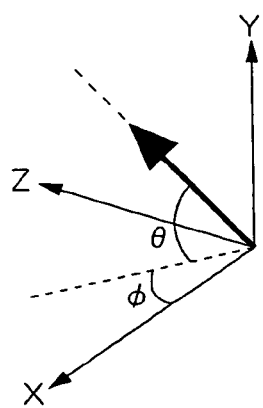

FIG. 4 (A) and FIG. 4 (B) are diagrams for explaining the calculation method of the position and direction of the gun-shaped controller. FIG. 4 (A) shows the spatial positional relationship of the gun-shaped controller and the respective sensors 20a to 20d, and FIG. 4 (B) shows the definition of the vector representing the direction of the gun-shaped controller.

As shown in FIG. 4, each of the sensors 20a to 20d is disposed in the vicinity of the four corners of a screen 28a of the monitor 28. In detail, the sensor 20a is disposed at the upper left of the screen 28a, the sensor 20b is disposed at the upper right of the screen 28a, the sensor 20c is provided at the lower left of the screen 28a, and the sensor 20d is disposed at the lower right of the screen 28a. In this example, basically, the area surrounded by these sensors 20a to 20d will be the detection area. This detection area is the area to be aimed with the gun-shaped controller 12. Although this will also depend on the sensitivity of each sensor, the area in which the respective sensors are able to detect the detectable wave transmitted from the gun-shaped controller 12 shall be an area that is wider than the foregoing detection area.

The respective sensors 20a to 20d have three sensor planes disposed toward mutually different directions, and these three sensor planes are respectively facing the X direction (horizontal direction), Y direction (vertical direction), and Z direction (depth direction). Each of the sensors 20a to 20d detects, with the three sensor planes, the intensity (amount of entering infrared light in this example) of the detectable signal in the X, Y, Z directions transmitted from the light emission unit 42 of the gun-shaped controller 12 (or 14).

The sensor control unit 22 seeks the three-dimensional direction vector representing the position of the gun-shaped controller 12, with the disposed position of each sensor 20a to 20d as the basic point, based on the ratio of the amount of entering light in the X, Y, Z directions of the respective sensors 20a to 20d. As shown in FIG. 4, the direction vector va corresponding to the sensor 20a, the direction vector vb corresponding to the sensor 20b, the direction vector vc corresponding to the sensor 20c, and the direction vector vd corresponding to the sensor 20d are respectively sought. As a result of synthesizing these direction vectors va, vb, vc and vd, the position of the controller can be obtained as a three-dimensional coordinate value (x, y, z). Further, the direction of the controller is obtained as two angles; namely, angle θ formed with the XZ plane, and angle φ formed with the XY plane.

Here, so as long as the direction vector with sensors in at least two locations as the basic point are known, the position of the gun-shaped controller 12 (or 14) can be known. Moreover, when the light emission unit 42 of the gun-shaped controller 12 emits light at an arbitrary position toward an arbitrary direction, the ratio of the amount of entering light in each sensor 20a to 20d will be determined uniquely. Therefore, the sensor control unit 22 calculates the direction to which the gun-shaped controller 12 is facing based on the ratio of the amount of entering light in relation to the respective sensors 20a to 20d. Incidentally, although the direction of the gun-shaped controller 12 may be suitably defined, for instance, it would be desirable to make it correspond to the direction of the barrel of the gun.

When the position and direction of the gun-shaped controller 12 are calculated as described above, it will be possible to determine where on the screen and from what angle the player using the gun-shaped controller 12 is aiming, and the distance of the player (far or near) to the screen can also be determined. Therefore, the position of the gun-shaped controller 12 (i.e., position of the player) can be converted into a position in the game space to determine the relative positional relationship (distance, direction) with the object existing in such game space, and various game presentations can be made upon utilizing such determination result.

Next, the operational procedure for calculating the position and direction of the respective gun-shaped controllers is explained.

Figure 5:
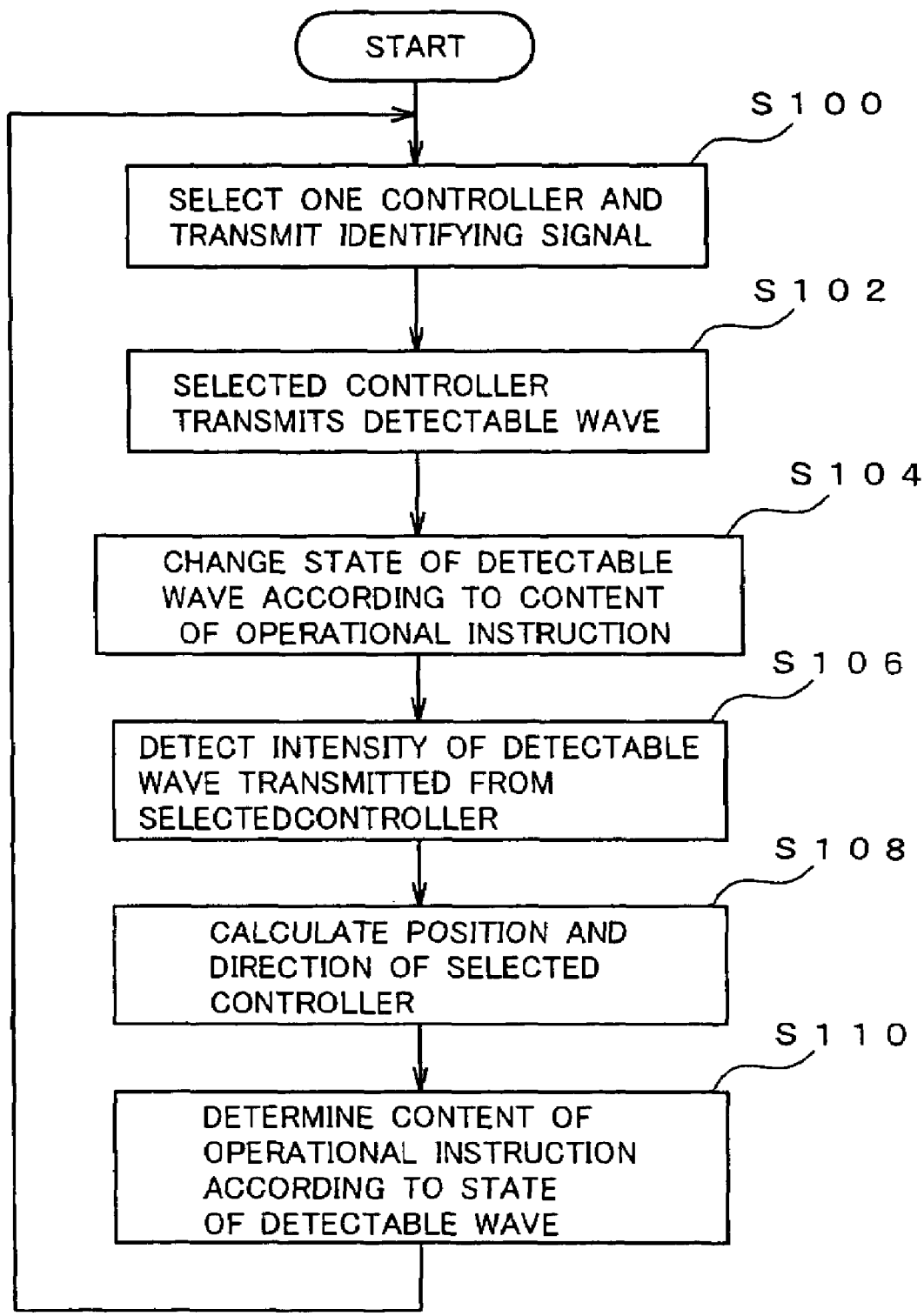
FIG. 5 is a flowchart for-explaining the operation of calculating the position and direction as well as determining the contents of the operational instructions of each gun-shaped controller.

FIG. 5 is a flowchart for explaining the operation of calculating the position and direction as well as determining the contents of the operational instructions of each gun-shaped controller.

The sensor control unit 22 selects one controller among the respective gun-shaped controllers 12, 14 in each prescribed timing (e.g., each 0.1 second), and transmits an identifying signal for identifying the selected controller via the transmission unit 24 (step S100).

The light emission control unit 44 provided to each gun-shaped controller 12, 14 receives the identifying signal via the reception antenna 45, determines whether its own gun-shaped controller is being selected based on the identifying signal, and, when one's own controller is being selected, makes the light emission unit 42 output a detectable wave. As a result, only one gun-shaped controller that was selected (selected controller) will transmit the detectable wave (step S102). For example, an explanation of the selected controller being the gun-shaped controller 12 is provided below. With the present embodiment, since the respective controllers will not have to constantly emit light, it will be possible to suppress the power consumption since the emission of light is only required upon becoming a selected controller, and the life of the battery 48 can be prolonged. Further, since only one controller will be selected and emit light in a certain timing, it will be possible to suppress the emission of light that will generate noise.

Moreover, in parallel with the operation shown at step S102, the light emission control unit 44 of the gun-shaped controller 12, which is the selected controller, control is performed for changing the state of the detectable wave output from the light emission unit 42 according to the content of the operational instruction (operational state of the trigger switch 40 in this example) (step S104). For instance, in the present embodiment, control for making the detectable wave flash as a pulse is performed, and the content of the operational instruction is overlapped with the detectable wave by varying this flashing state and expressing a digital signal (serial signal).

When the detectable wave is transmitted from the gun-shaped controller 12 (selected controller), the intensity thereof is detected with the respective sensors 20a to 20d (step S106). The sensor control unit 22 calculates the position and direction of the gun-shaped controller 12 (selected controller) based on the intensity of the detectable wave detected with each of the sensors 20a to 20d (step S108). The specific calculation method is as described above (c.f. FIG. 4).

Moreover, the sensor control unit 22 determines the content of the operational instruction overlapped with the detectable wave based on the state of the detectable wave detected with each of the sensors 20a to 20d (step S110). As described above, in this example, since the digital signal is expressed with the state of the detectable wave, the content of the operational instruction is determined pursuant to the content of this digital signal. Incidentally, with respect to the detection result of the respective sensors 20a to 20d, for instance, it is also preferable to extract three detection results in the order from the strongest signal intensity, and subjecting these to processing such as comparing the content of the digital signals to be determined based on these detection result and taking a majority vote so as to improve the determination accuracy of the content of the operational instruction. The calculation result of the position and direction of the gun-shaped controller 12 (selected controller) and the content of the operational instruction obtained as described above are output from the sensor control unit 22 to the game computation unit 32. And, the routine returns to step S100 described above, and the subsequent processing steps are repeated.

Next, the operational procedures of the game control unit 26 to be conducted in parallel with the processing depicted in FIG. 5 described above are explained.

Figure 6:
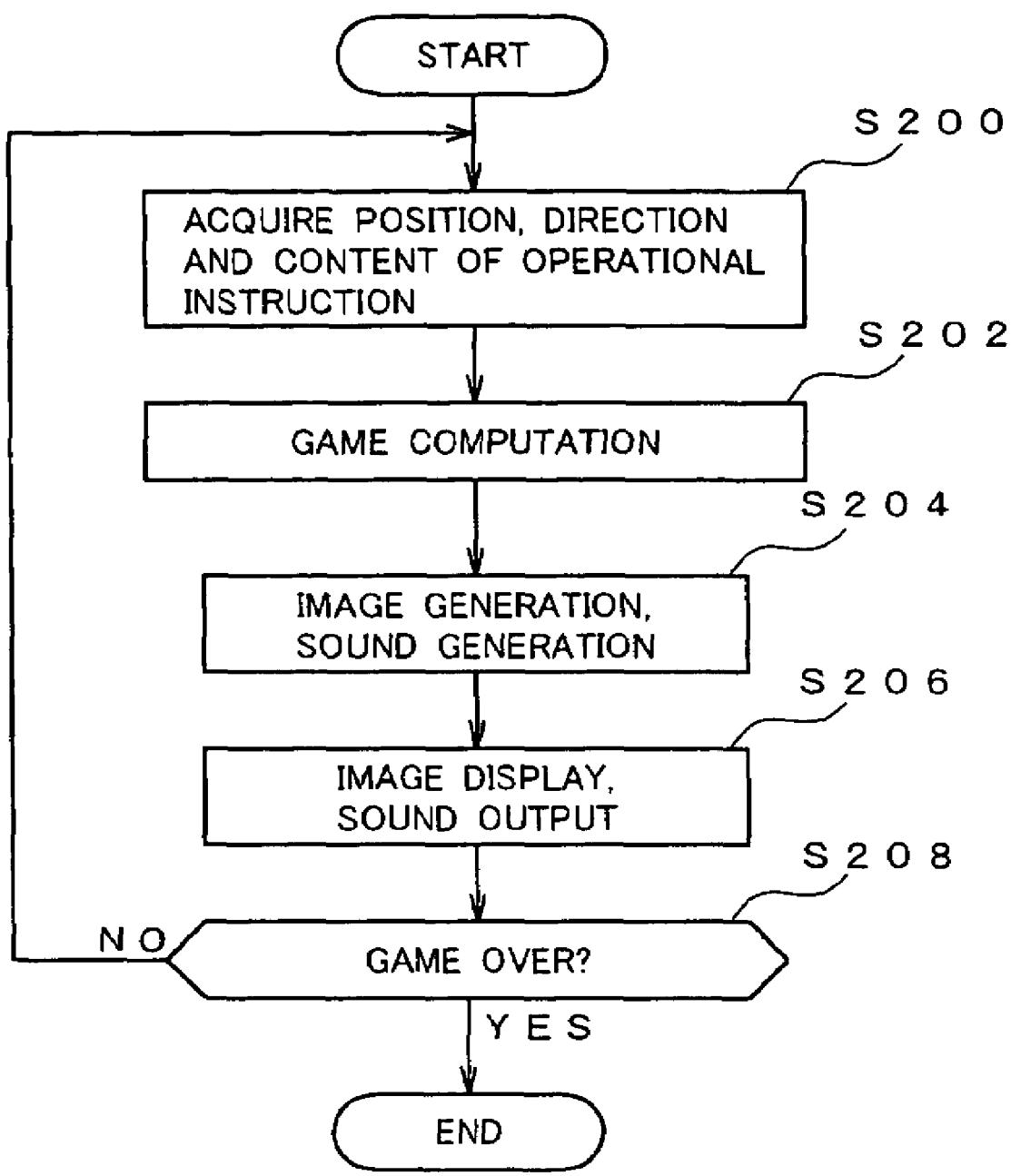
FIG. 6 is a flowchart showing the operation procedure of the game control unit.

FIG. 6 is a flowchart showing the operational procedure of the game control unit. The series of processing steps shown in FIG. 6 are repeated, for instance, every 1/60 seconds in correspondence with the generation timing of the game image.

The game computation unit 32 in the game control unit 26 acquires the position and direction of the respective gun-shaped controllers 12, 14, as well as the information regarding the content of the operational instruction (step S200). Specifically, a flag (data) showing the calculation result of the sensor control unit 22 is written into the work RAM 103 (c.f. FIG. 2) as needed, and information regarding the position and the like of each controller can be acquired by referring to this flag.

Next, the game computation unit 26 performs prescribed game computation such as setting the state of each object disposed in the game space by using information regarding the position and the like of the respective gun-shaped controllers (step S202). In the present embodiment, as a result of obtaining the position and direction of the respective gun-shaped controllers, various game presentations that were not possible conventionally are enabled. Specific examples of the game presentation will be described later.

When prescribed game computation is performed with the game computation unit 26, in accordance with such computation result, a game image is generated with the image generation unit 34, and game sound is generated with the sound generation unit 36 (step S204). As a result of such game image and game sound being sent to the monitor 28, a game image is displayed, and game sound is output (step S206).

Further, the game computation unit 26 determines whether it is game over (step S208). When it is not game over, an affirmative judgment is made at step S208, the routine returns to step S200 described above, and the subsequent processing steps are repeated. In addition, when it is game over, the game computation unit 26 ends the series of processing steps.

Figure 7:
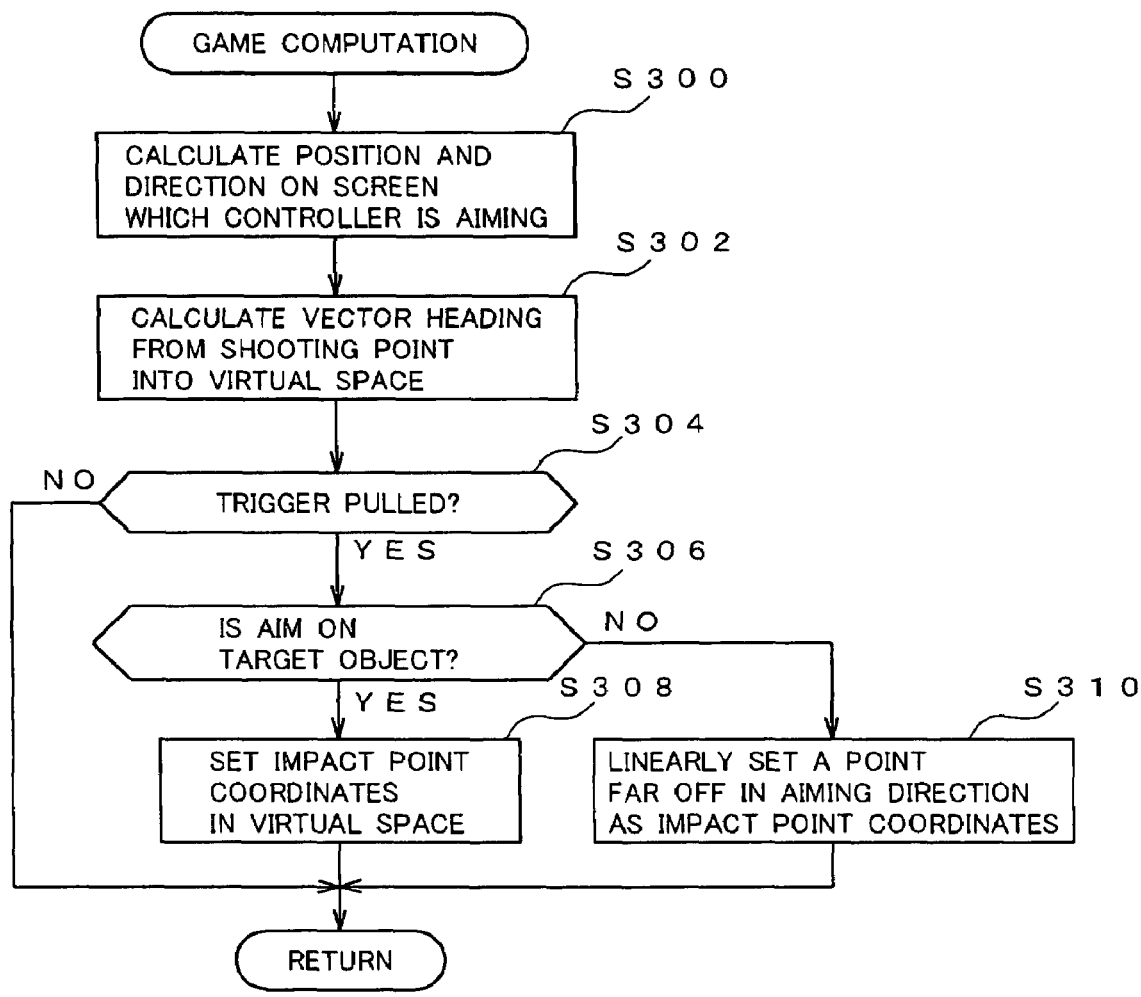
FIG. 7 is a flowchart showing a specific example of the game computation.

FIG. 7 is a flowchart showing a specific example of the processing performed at step [S]202 described above. For example, the processing routine in a case of shooting down an enemy object with the gun-shaped controller is exemplified.

Foremost, the game computation unit 32 calculates the position on the screen 28a to which the gun-shaped controller 12 is aiming and the direction (orientation) of the vector heading from the gun-shaped controller 12 to such position based on the detection result of the position (firing point) and direction of the gun-shaped controller in the real space of the with the monitor 28 as the reference (step S300). Specifically, the firing point on the screen is calculated with the two-dimensional coordinates with a prescribed position (upper left corner for example) of the screen 28a as the reference, and the angles θ and φ obtained at step S200 are used for the direction of the vector.

Next, the game computation unit 32 converts the firing point on the screen 28a into the firing point in the virtual space, and calculates the vector headed from the converted firing point into the virtual space (step S302). Here, when the gun-shaped controller 12 is facing straight at the screen 28a; in other words, when it is disposed in a direction that is approximately orthogonal thereto, the position of the firing point on the screen 28a may be set to be the center of the screen.

Next, the game computation unit 32 determines whether the operator pulled the trigger based on the content of the operational instruction acquired at step S200 (step S304). When the trigger has not been pulled, a negative judgment is made, and the processing routine of this example is ended.

Further, when the trigger has been pulled, an affirmative judgment is made at step S304, and the game computation unit 32 judges whether the aim is on the target object such as an enemy character (step S306). Specifically, the game computation unit 32 makes the judgment at step S306 by searching whether the target object exists on the extension of the vector direction from the firing point in the virtual space.

When the aim is on the target object, an affirmative judgment is made at step S306, and the game computation unit 32 sets the impact point coordinates at the intersection point of the vector direction from the firing point and the target object in the virtual space (step S308). When this kind of game computation is performed, after the processing routine of this example is ended, an image expressing the target object such as an enemy character being hit and the corresponding reaction (e.g., injury, destruction, etc.) is generated and displayed.

Moreover, when the aim is not on the target object, a negative judgment is made at step S306, the game computation unit 32 sets the a far distance (e.g., an approximate infinite distance) extending in the direction (aiming direction) in the virtual space as the impact point coordinates (step S310). When this kind of game computation is performed, after the processing routine of this example is ended, an image expressing the target object such as an enemy character not being hit is generated and displayed.

As described above, with the game computation of this example, since the hit or miss judgment is made upon giving consideration to the direction (orientation) in relation to the coordinate position in addition to the two-dimensional coordinates on the screen 28a, a more realistic game presentation with high realistic sensation can be realized.

Figure 8A:
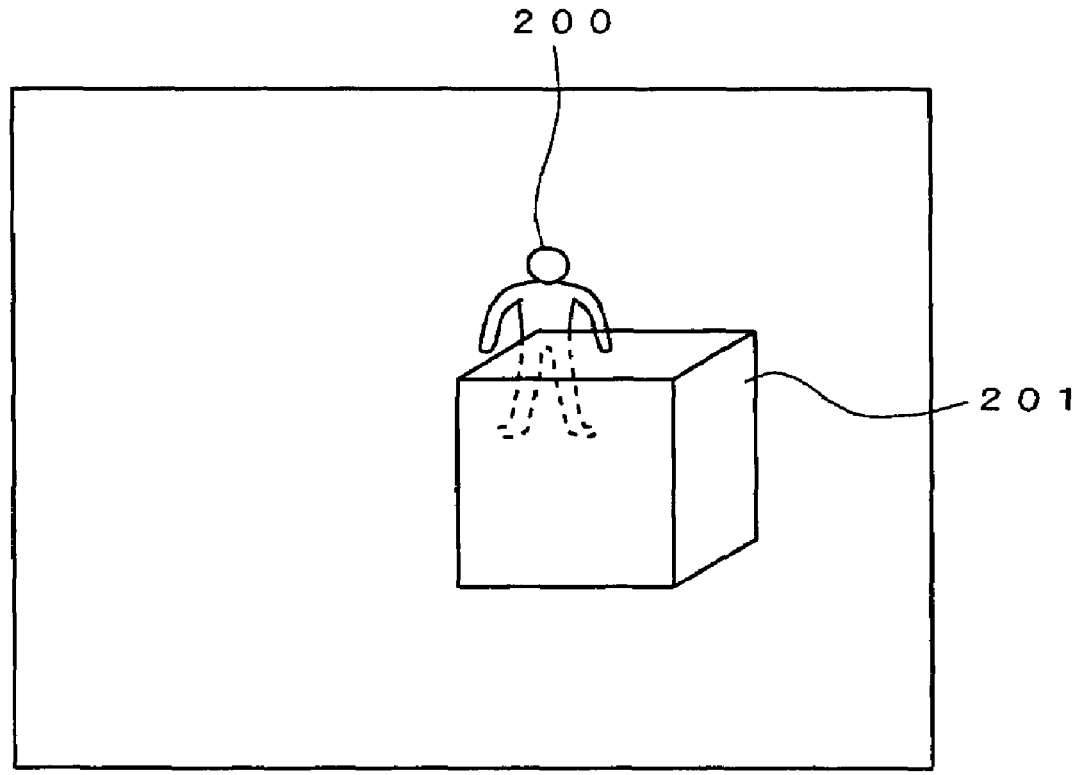
FIG. 8 (A) and FIG. 8 (B) are diagrams for explaining a specific example of the game presentation realized with the processing illustrated in FIG. 7.
Figure 8B:
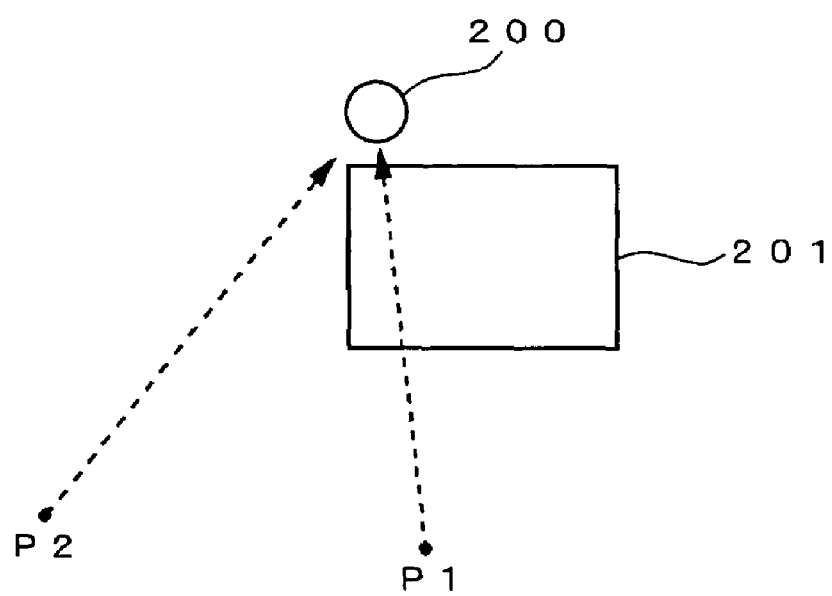

FIG. 8 (A) and FIG. 8 (B) are diagrams for explaining a specific example of the game presentation realized with the processing illustrated in FIG. 7. FIG. 8 (A) shows a display example of the game image, and FIG. 8 (B) shows the correspondence of the object in the game space (virtual space) corresponding to the game image illustrated in FIG. 8 (A), and the position and direction of the gun-shaped controller.

As shown in FIG. 8, let it be assumed that an enemy character 200 is hiding in the shadows of (behind) an object 201 in the game space. When the gun-shaped controller 12 (or 14) is aiming for the enemy character 200 from the position P1 shown in FIG. 8 (B), since the enemy character 200 is shielded with the object 201, it will be difficult for the player to hit the [enemy character 200] easily. In order to hit the enemy character 200 from this position P1, the player will have to raise the gun-shaped controller 12 to a high position, and aim from above at a steep angle (primarily corresponding to θ). Meanwhile, when the gun-shaped controller 12 is aiming at the enemy character 200 from the position P2 shown in FIG. 8 (B), the positional relationship will enable the player to aim for the enemy character 200 from the lateral side of the object 201. As a result of aiming from a wide horizontal angle (primarily corresponding to φ), the player will be able to hit the enemy character from this position P2. As described above, a game presentation reflecting the positional relationship of the respective objects in the game space will be enabled, and a game presentation with high realistic sensation can be realized. When considering the conventional method of only detecting the two-dimensional positions on the screen as a comparative example, in the situation shown in FIG. 8, the enemy character 200 can be hit so as long as the player aims at the display position of such [enemy character 200] regardless of the position or direction the shot is to be fired, and this will result in a game presentation lacking reality.

Further, since it will be possible to determine from which direction the enemy character 200 as the shooting target was hit, or from what distance it was hit, an expression with further realistic sensation can be realized upon expressing the impact. An example of the game computation for realizing such an expression is explained below.

Figure 9:
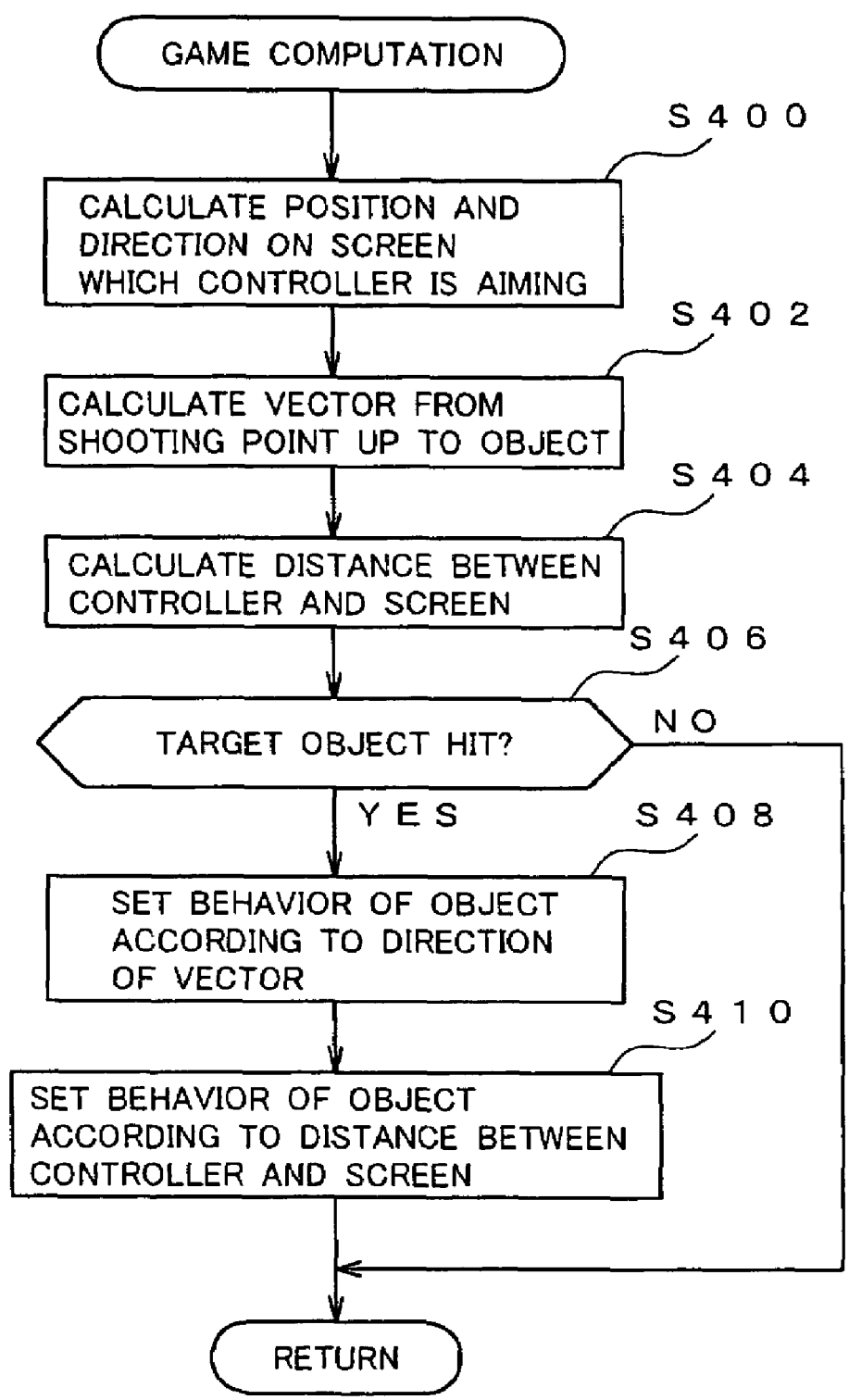
FIG. 9 is a flowchart showing another specific example of the game computation.

FIG. 9 is a flowchart showing another specific example of the processing at step [S]202. For example, the processing routine for expressing the impact in consideration of the direction or distance upon impact when the gun-shaped controller 12 is used to shoot the enemy object is exemplified.

Foremost, the game computation unit 32 calculates the position on the screen 28a to which the gun-shaped controller 12 is aiming and the direction (orientation) of the vector heading from the gun-shaped controller 12 to such position (step S400). Next, the game computation unit 32 converts the firing point on the screen 28a into the firing point in the virtual space, and calculates the vector headed from the converted firing point into the virtual space (step S402). The specific contents of the processing at these steps S400, S402 are the same as the steps S300, S302 shown in FIG. 7, respectively.

Further, the game computation unit 32 calculates the relative distance of the gun-shaped controller 12 and the screen 28a (step S404).

Next, the game computation unit 32 determines whether the bullet fired from the gun-shaped controller 12 hit the target object such as an enemy character (step S406). Specifically, the game computation unit 32 makes the judgment at step S406 by searching whether the target object exists on the extension of the vector direction from the firing point in the virtual space.

When the bullet hits the target object, an affirmative judgment is made at step S406, and the game computation unit 32 sets the behavior of the object according to the vector direction from the firing point in the virtual space (step S408). For instance, behavior of the object in the vector direction being blown away is set.

Moreover, in parallel with the processing shown at step S408, the game computation unit 32 sets the behavior of the object according to the distance between the gun-shaped controller 12 and screen 28a (step S410). Specifically, as a result of multiplying a prescribed multiple to the distance between the controller and screen, this is converted into the distance in the virtual space, and the behavior of the object is set according to the length of such distance. For example, behavior of the object being blown to pieces is set when the distance is short, and behavior of the object being partially destroyed is set when the distance is long. Or, in a game setting where light for illuminating the darkness is provided to the gun-shaped controller, behavior of the irradiation area of light being expanded as the gun-shaped controller comes near, and behavior of the irradiation area of light being narrowed as the gun-shaped controller backs away may be considered.

When this kind of game computation is performed, after the processing routine of this routine is ended, an image expressing the foregoing behavior when the target object such as an enemy character is hit is generated and displayed.

As a result of the processing illustrated in FIG. 9, for example, when a shot is fired form the foregoing position P2 (c.f. FIG. 8), various expressions such as the right side (left side on the screen) of the enemy character 200 being damaged more severely, or the [enemy character 200] being blown away from the right side can be realized. Further, even when a shot is fired from the position P1, depending on the angle of the shot fired, various expressions such as the object 201 being blown away entirely, or the top portion thereof being blown away can be realized. Moreover, when the shot is fired from a closer position (specifically, a position near the monitor 28), presentations where the damage to the enemy character 200 is more severe, or the destruction of the object 201 is more significant can be realized.

Further, since it is possible to determine the length of the relative distance of the enemy character 200 or object 201 and the gun-shaped controller, an expression reflecting the length of this relative distance is enabled. An example of the game computation for performing such expression is described below.

Figure 10:
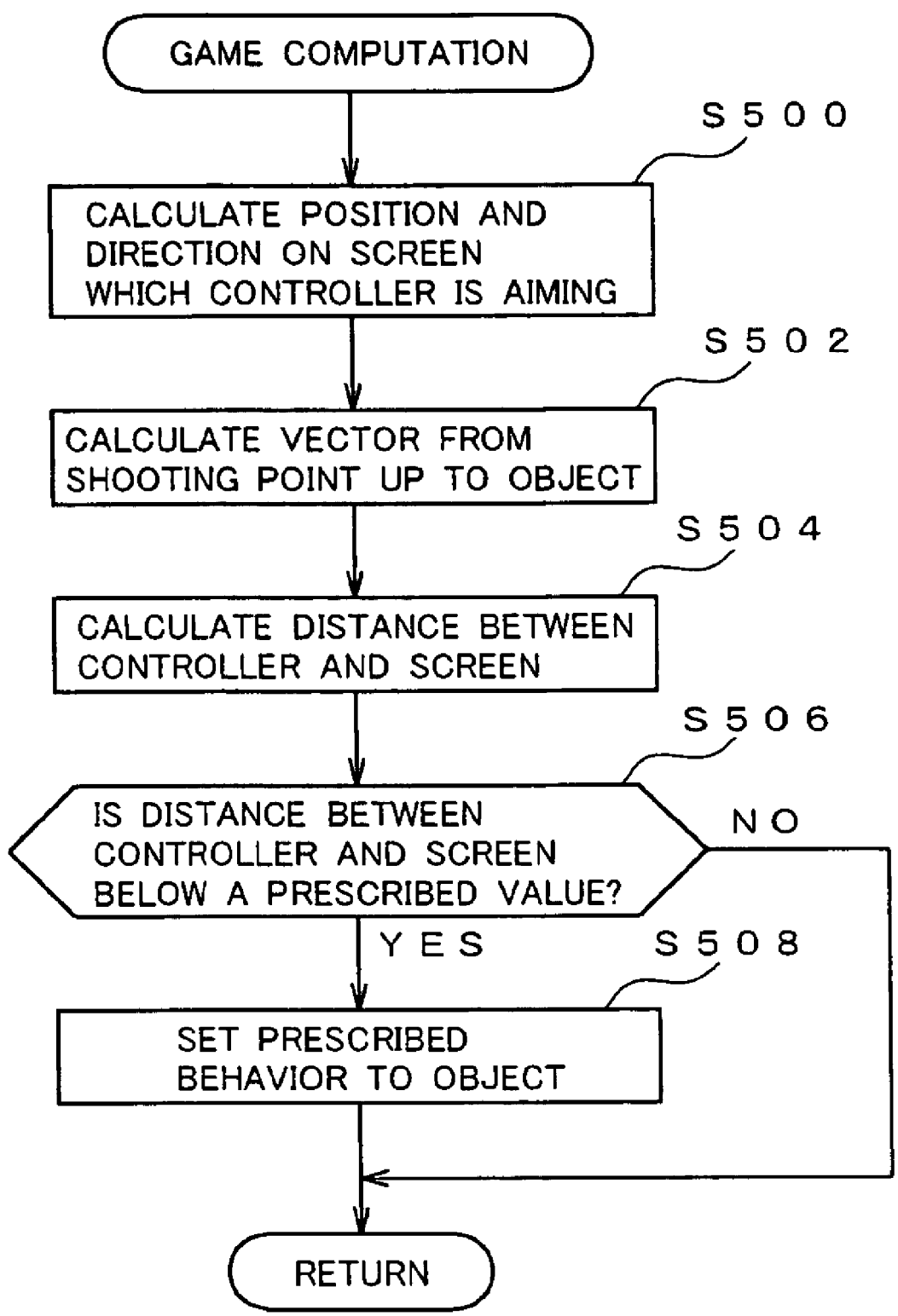
FIG. 10 is a flowchart showing another specific example of the game computation.

FIG. 10 is a flowchart showing another specific example of the processing at step [S]202. For example, when shooting an enemy object with the gun-shaped controller 12, the processing routine in which the behavior of the object is changed and set according to the distance between the gun-shaped controller 12 and the screen is exemplified.

Foremost, the game computation unit 32 calculates the position on the screen 28a to which the gun-shaped controller 12 is aiming and the direction (orientation) of the vector heading from the gun-shaped controller 12 to such position (step S500). Next, the game computation unit 32 converts the firing point on the screen 28a into the firing point in the virtual space, and calculates the vector headed from the converted firing point into the virtual space (step S502). The specific contents of the processing at these steps S500, S502 are the same as the steps S300, S302 shown in FIG. 7, respectively.

Further, the game computation unit 32 calculates the relative distance of the gun-shaped controller 12 and the screen 28a (step S504).

Next, the game computation unit 32 determines whether the relative distance of the gun-shaped controller 12 and the screen 28a is below a prescribed value (step S506). Or, the processing at this step may multiply a prescribed multiple to the distance between the controller and the screen to convert this to a distance in the virtual space, and determine whether such distance is below a prescribed value.

When the distance between the controller and the screen is below a prescribed value, an affirmative judgment is made at S506, and the game computation unit 32 sets a prescribed behavior to the object (step S508). For example, behavior such as the enemy character 200 (c.f. FIG. 8) becoming scared and running away when the gun-shaped controller is brought closer is set. When this kind of game computation is performed, after the processing routine of this example is ended, an image expressing the foregoing behavior upon the target object such as an enemy character being hit is generated and displayed.

Further, it is also possible to perform processing of moving the position of the virtual viewpoint (camera viewpoint) upon generating the game image by giving consideration to the positional relationship of the controller and enemy character 200. An example of the game computation for realizing such an expression is explained below.

Figure 11:
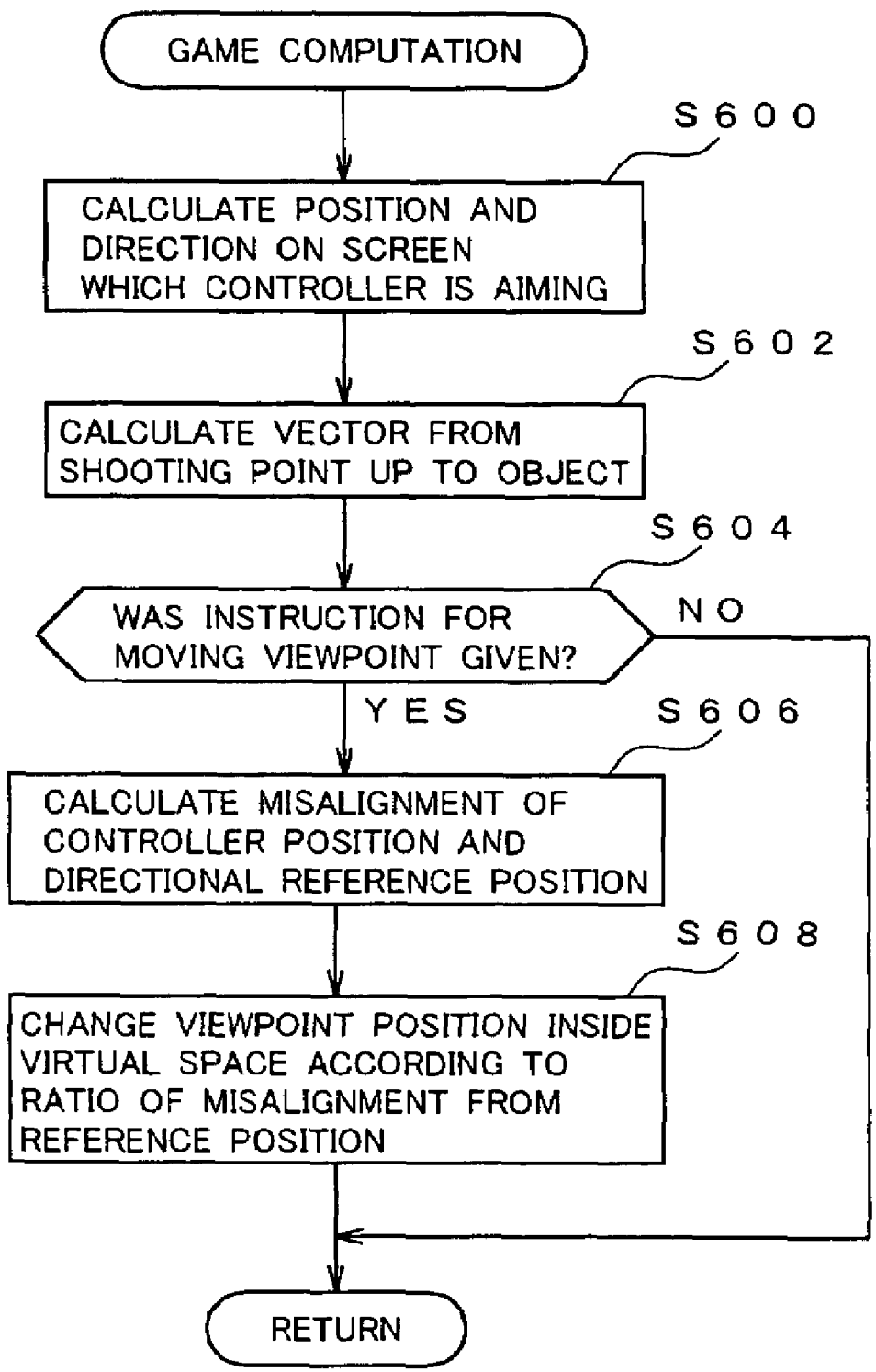
FIG. 11 is a flowchart showing another specific example of the game computation.

FIG. 11 is a flowchart showing another specific example of the processing at step [S]202. For example, when shooting an enemy object with the gun-shaped controller 12, the processing routine in which the virtual viewpoint is to be moved according to the positional relationship of the gun-shaped controller 12 and the object is exemplified.

Foremost, the game computation unit 32 calculates the position on the screen 28a to which the gun-shaped controller 12 is aiming and the direction (orientation) of the vector heading from the gun-shaped controller 12 to such position (step S600). Next, the game computation unit 32 converts the firing point on the screen 28a into the firing point in the virtual space, and calculates the vector headed from the converted firing point into the virtual space (step S602). The specific contents of the processing at these steps S600, S602 are the same as the steps S300, S302 shown in FIG. 7, respectively.

Next, the game computation unit 32 determines whether the operator instructed to move the viewpoint (step S604). This instruction, for example, is preferably given with a switch (not shown) for instructing the movement of the viewpoint provided to the gun-shaped controller or game device body.

When the instruction of the viewpoint movement is given, an affirmative judgment is made at step S604, and the game computation unit 32 calculates the misalignment of the position of the controller and the directional reference position (step S606). When the light emission unit 42 of the gun-shaped controller 12 emits light at an arbitrary position and toward an arbitrary direction, the ratio of the amount of entering light in each of the sensors 20a to 20d will be determined uniquely. Therefore, the game computation unit 32 makes the vector (corresponds to the normal vector in relation to the screen) when all four sensors obtain equal amounts of entering light as the directional reference position, and calculates the misalignment of such position and the current position of the controller.

Next, the game computation unit 32 changes the position of the virtual viewpoint (viewpoint position) in the virtual space according to the misalignment ratio from the directional reference position of the controller position (step S608). When this kind of game computation is performed, after the processing routine of this example is ended, a game image after the position of the virtual viewpoint is changed is generated and displayed.

Figure 12A:
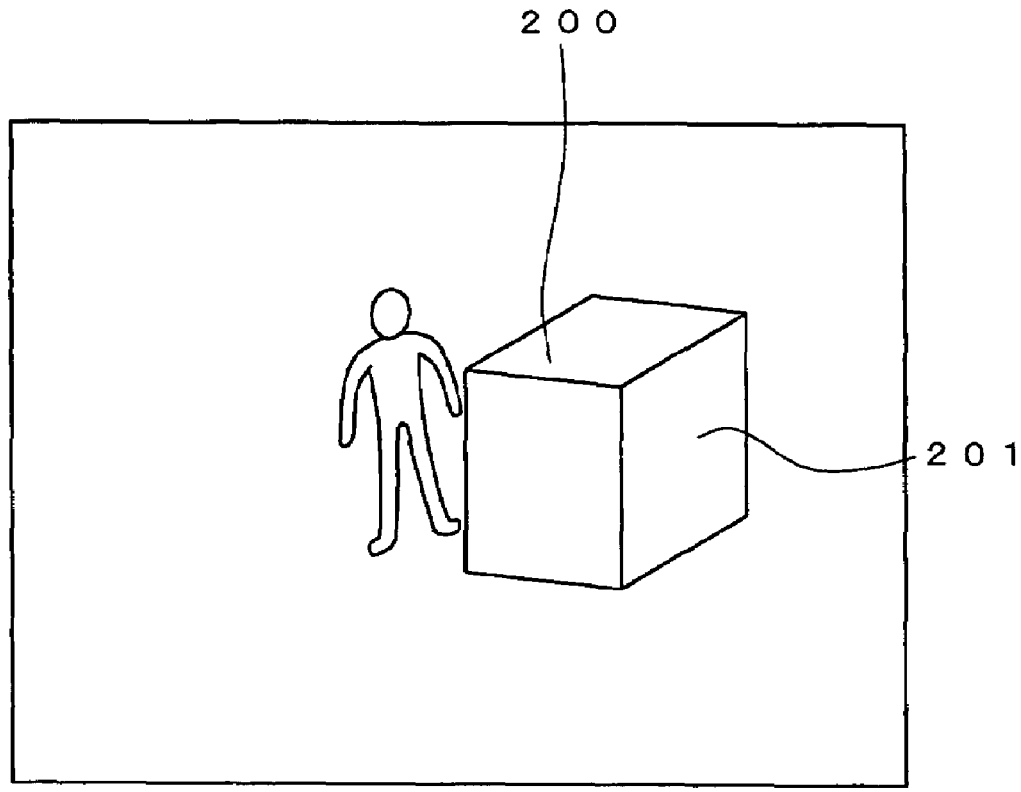
FIG. 12 (A) and FIG. 12 (B) are diagrams for explaining a specific example regarding the processing contents when the position of the virtual viewpoint is to be changed.
Figure 12B:
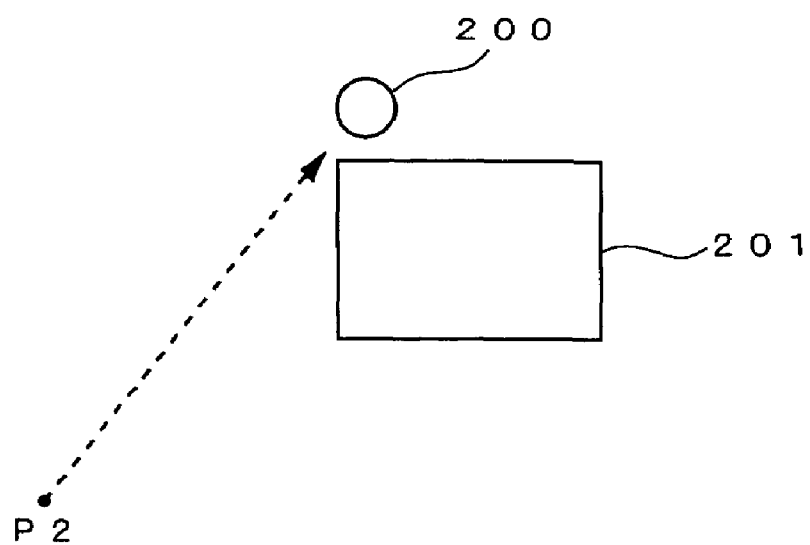

FIG. 12 (A) and FIG. 12 (B) are diagrams for explaining a specific example regarding the processing contents when the position of the virtual viewpoint is to be changed. FIG. 12 (A) shows a display example of the game image, and FIG. 12 (B) shows the correspondence of the object in the game space corresponding to the game image shown in FIG. 12 (A), and the position and direction of the gun-shaped controller. As shown in FIG. 12 (B), when the gun-shaped controller is at the position P2, the position of the virtual viewpoint upon generating the game image may be changed in consideration of the relationship of this position and the enemy character 200. As a result, for example, the view will change from the game image shown in FIG. 8 to the game image shown in FIG. 12 (A). Thereby, a game image, in which the accurate viewpoint position is set upon reflecting the player's behavior, can be generated and displayed, and the realistic sensation of the game can be further improved. This kind of presentation is particularly effective when there is only one player.

Incidentally, although the processing shown in FIG. 11 moves the virtual viewpoint when an instruction for moving the viewpoint is given, the viewpoint position may be moved regardless of such instruction. For example, when the game is set to a combat mode, an image representation of moving the gun sight displayed on the screen in synchronization with the movement of the controller can be realized. Further, when the game is set to a travel mode (non-combat mode), the viewpoint position may be moved as needed in synchronization with the movement of the controller.

As described above, with the game device according to the present embodiment, since the position and direction of the gun-shaped controller 12 (or 14) in the real space is calculated and the calculation result thereof is reflected in the generation of images, it is possible to generate images of high realistic sensation by accurately reflecting how the operator is operating the operational means; in other words, by reflecting the operator's behavior.

Meanwhile, when a plurality of game devices according to the present embodiment is to be disposed at a relatively close proximity, it will be necessary to distinguish the gun-shaped controller used in one's own game device from the gun-shaped controllers used in the other game devices. The constitution and method for respectively identifying the gun-shaped controllers corresponding to the respective game devices will be explained.

Figure 13:
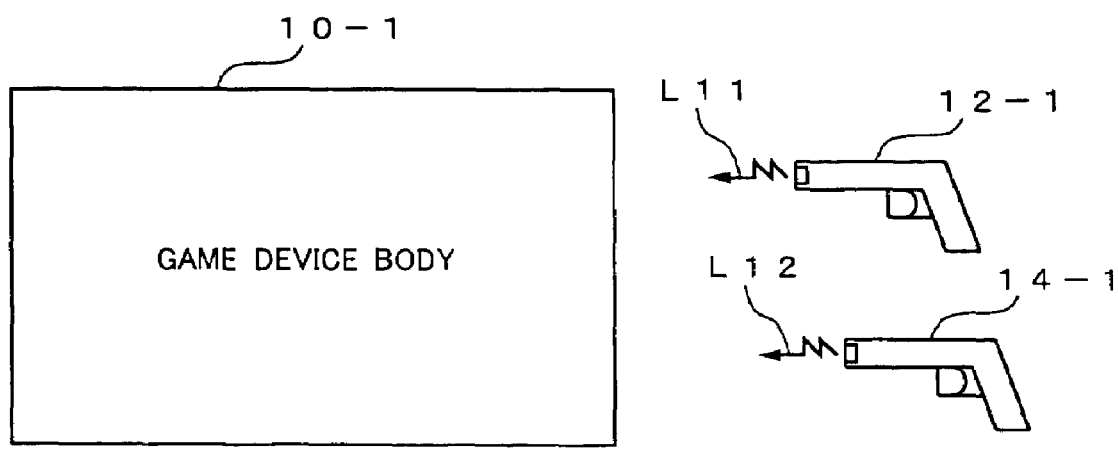
FIG. 13 is a diagram for explaining the technique of identifying the gun-shaped controller when a plurality of game devices is to be disposed in close proximity.
Figure 13:
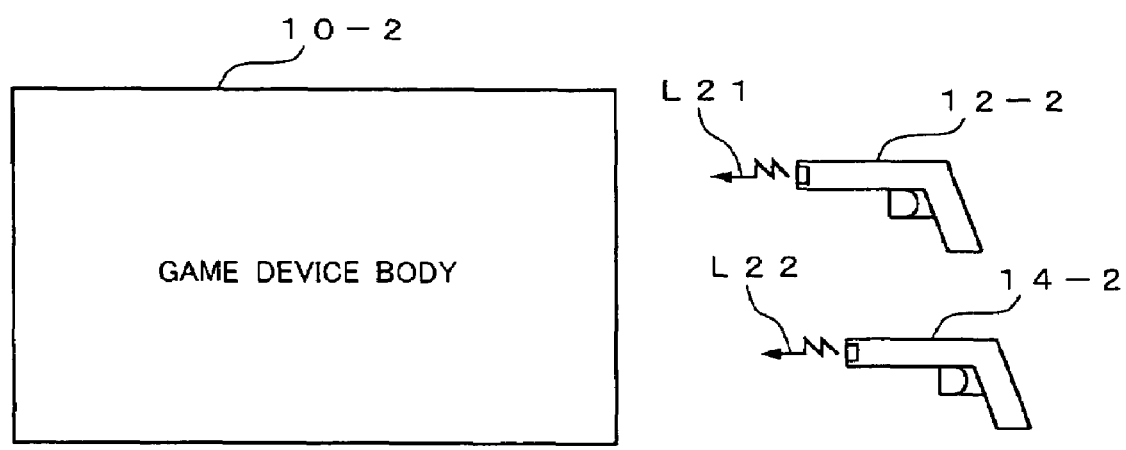

FIG. 13 is a diagram for explaining the technique of identifying the gun-shaped controller when a plurality of game devices is to be disposed in close proximity. In FIG. 13, the respective gun-shaped controllers 12-1, 14-1 correspond to the game device body 10-1, and the respective gun-shaped controllers 12-2, 14-2 correspond to the game device body 10-2. Here, it is desirable that the light emission control unit provided to each gun-shaped controller controls the characteristics of the detectable wave such that the detectable wave that it transmits can be distinguished from the detectable waves used by the other devices. In the present embodiment, the frequency f1 of the detectable waves L11 and L12 transmitted from the respective gun-shaped controllers corresponding to the game device body 10-1, and the frequency f2 of the detectable waves L21 and L22 transmitted from the respective gun-shaped controllers corresponding to the game device body 10-2 are set to have different values. And, the sensor control unit provided to each game device 10-1 or 10-2 identifies the gun-shaped controller used in its own device by determining the characteristics (frequency) of the detectable wave from the detection result of the respective sensors. Incidentally, the same applies when there are three or more game devices, and the controllers corresponding to the respective game devices can be identified thereby.

Incidentally, the present invention is not limited to the description of the foregoing embodiments, and may be modified variously within the scope of the gist of the present invention. For instance, in the foregoing embodiments, although described was a constitution where two gun-shaped controllers are provided, and up to two players can simultaneously play the game, by adding the gun-shaped controller as needed, more players can simultaneously play the game.

Further, in the foregoing embodiments, although each sensor was provided with sensor planes in three directions, a sensor having only one sensor plane can also be used. Here, there is an advantage in that the constitution can be simplified, the cost can be decreased, and the processing load upon calculating the position and the like can be alleviated.

Moreover, in the foregoing embodiments, although an explanation was provided taking a game device employing a gun-shaped controller as an example, the applicable scope of the present invention is not limited thereto, and the present invention can also be employed in other game devices using a sword-shaped controller or other various types of controllers. For instance, in a game employing a sword-shaped controller, since the position and direction of such controller can be obtained, a presentation of making the depth of the cut in the enemy character disposed in the game space to be shallow or deep depending on the position of the controller, or a presentation of setting various patters regarding from where and from what direction the enemy character will be cut can be realized. An example of the game computation for such presentations is now explained.

Figure 14:
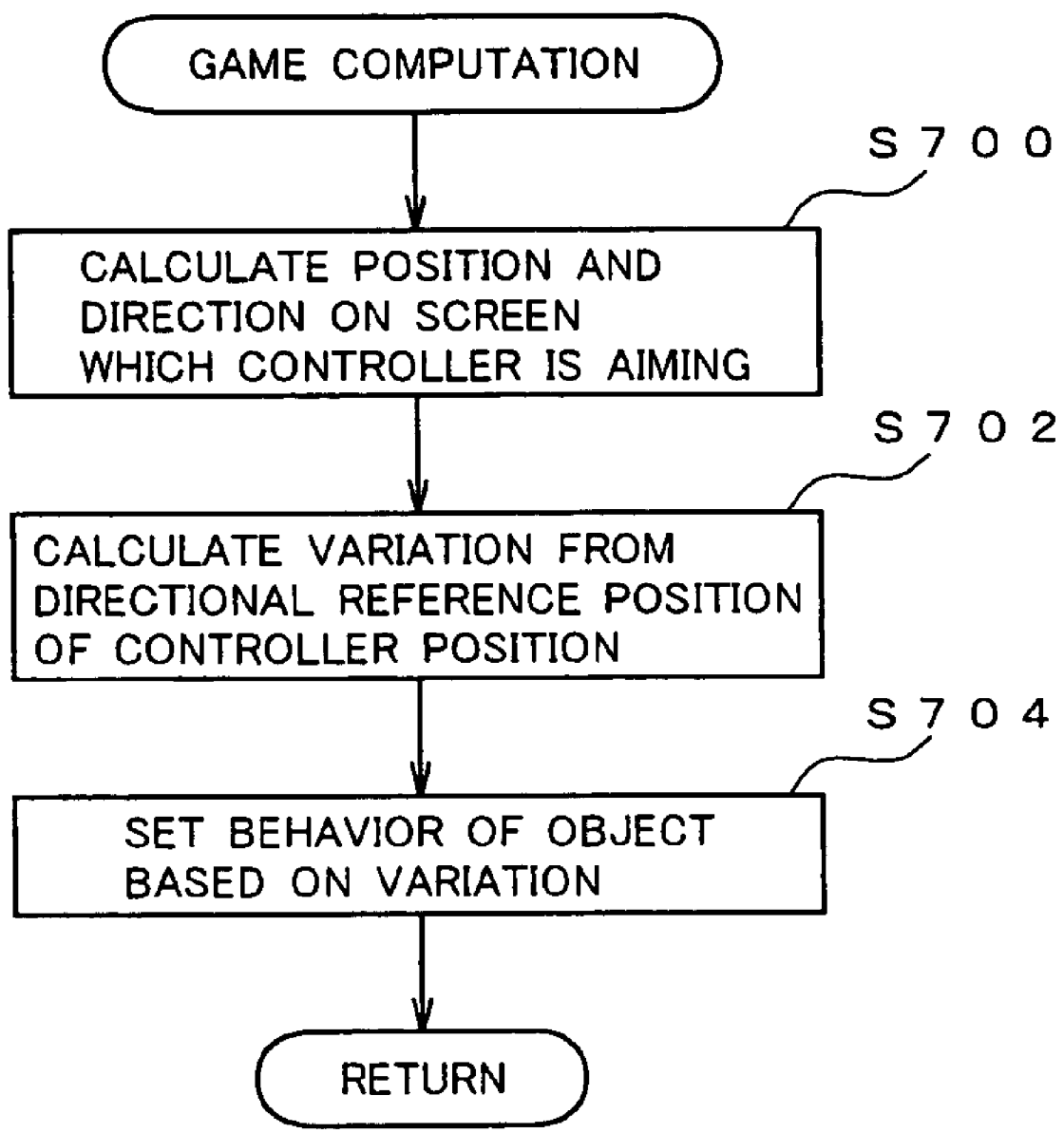
FIG. 14 is a flowchart shoring another specific example of the game computation.

FIG. 14 is a flowchart shoring another specific example of the game computation. The processing of this example is another specific example of the game computation shown in step S202 of FIG. 6. For example, the processing routine of cutting an enemy object with the sword-shaped controller is exemplified below.

Foremost, the game computation unit 32 calculates the position on the screen 28a in which the sword-shaped controller is aiming, and the direction (orientation) of the vector headed from the sword-shaped controller to such position (step S700).

Next, the game computation unit 32 calculates the variation from the directional reference position of the position of the controller (step S702). This variation may be converted into the distance in the virtual space by multiplying a prescribed multiple. For instance, the direction vector is calculated from the difference (distance per unit time) of the controller position before movement and the controller position after movement. As a preferable example, an "attack button" is provided to the controller, and the player is able to cut the enemy while pressing such button. Here, the position of the controller at the time when the attack button is pushed is the position "before movement", and the distance for each frame (1/60 seconds) is calculated.

Next, the game computation unit 32 sets the behavior of the object in the virtual space based on the variation calculated at step S702 (step S704). For example, how deep the object is to be cut (or stabbed) is set according to the movement distance to the depth direction (Z direction) of the controller. When this kind of game computation is performed, after the processing routine of this example is ended, a game image after the position of the virtual viewpoint is changed is generated and displayed.

As described above, enabled are game presentations and image display full of realistic sensation that could not be realized with the conventional uniform processing. Incidentally, the processing shown in FIG. 14 may also be similarly employed in other game devices such as when expressing the displaying the movement of the arm (expression of the end extending toward the depth direction), speed of the arm or depth-of the punch in a boxing game.

In addition, the applicable scope of the present invention is not limited to a game device, and the present invention can be similarly employed in a so-called simulator (virtual reality device) enabling various virtual reality experiences, and a simulator with high realistic sensation can be realized thereby.

According to the present invention, since the position and direction of the operational means (controller) in the real space is calculated and the calculation result thereof is reflected in the generation of images, it is possible to generate images of high realistic sensation by accurately reflecting how the operator is operating the operational means; in other words, by reflecting the operator's behavior.

I claim:

1. A simulation apparatus, comprising:
    an information processing device;
    a monitor display connected to said information processing device;
    operational means connected to said information processing device, configured to be operable by a player and having radiation means which radiates a detectable wave expanding toward said monitor display; and
    a plurality of detection means disposed at mutually different positions along peripheries of said monitor display, each of said detection means being configured to detect intensity components of said detectable wave in three-dimensional directions;
    wherein said information processing device comprises calculation means which calculates positional coordinates of said operational means in a real space in front of said monitor display and an aiming direction of said operational means based on ratios of the intensity components of said detectable wave detected by said plurality of detection means at said different positions, wherein said information processing device is configured to:
        (a) calculate a scene including a first object and a second object in a virtual three-dimensional space;
        (b) display on the monitor display the scene viewed from a virtual viewpoint wherein said first object is located behind said second object when viewed from said virtual viewpoint in the virtual three-dimensional space;
        (c) convert, while the virtual viewpoint remains as set in (b), the calculated positional coordinates and the calculated aiming direction of said operational means in the real space into positional coordinates and an aiming direction in the virtual three-dimensional space so that a position of a virtual shooting point aiming at said first object along the aiming direction is set off the virtual viewpoint, which is set at the location as in (b), in the virtual three-dimensional space; and
        (d) determine if the converted aiming direction extending from said shooting point hits said first object.

2. The simulation apparatus according to claim 1, wherein each of said detection means includes three detector planes disposed toward three mutually different directions to provide said intensity components of said detectable wave.

3. The simulation apparatus according to claim I, wherein said operational means has detectable wave control means for changing the state of said detectable wave according to the content of said operational instruction; and
    said calculation means determines the content of said operational instruction based on the state of said detectable wave detected with said detection means, and outputs the content of said operational instruction to said image generation means.

4. The simulation apparatus according to claim 1, wherein said scene is a two-dimensional image viewed from the virtual viewpoint in the virtual space.

5. The simulation apparatus according to claim 1, wherein said operational means simulates a gun and a bullet virtually fired from said shooting point hits the first object located behind the second object in said virtual space.

6. The simulation apparatus according to claim 1 comprising a plurality of said operational means, wherein said calculation means transmits an identifying signal for selecting one among said plurality of operational means in each prescribed timing and identifying the selected operational means; and
    each of said plurality of operational means outputs said detectable wave based on said identifying signal when its own operational means is selected.

7. The simulation apparatus according to claim 1, wherein said detectable wave radiated from the operational means is identifiable from a detectable wave radiated from another operation means connected to a neighboring simulation apparatus.

8. The simulation apparatus according to claim 1, wherein said information processing device is a game device.

9. The simulation apparatus according to claim 1, wherein said information processing device is further configured to:
    change the virtual viewpoint to a point on a virtual line along which said converted aiming direction extends so that a scene is displayed in which said first and second objects are viewed.

10. A game device comprising:
    operational means simulating a gun and including radiation means which radiates a detectable wave;
    information processing means which controls progress of a game in response to operation by a player on the operational means; and
    a plurality of detection means disposed at mutually different positions along peripheries of a monitor display, each of said detection means being configured to detect intensity components of said detectable wave in three-dimensional directions,
    wherein said information processing means is configured to:
        (a) calculate a scene including a target object and a background object in a virtual three-dimensional space;
        (b) display on the display the scene viewed from a virtual viewpoint in which said target object is located behind said background object when viewed from said virtual viewpoint in the virtual three-dimensional space;
        (c) calculate positional coordinates and an aiming direction of said operational means in a real three-dimensional space in front of said monitor display based on ratios of the intensity components of said detectable wave detected by said plurality of detection means at said different positions,
        (d) convert, while the virtual viewpoint remains as set in (b), the calculated positional coordinates and the calculated aiming direction of said operational means into positional coordinates and an aiming direction in the virtual three-dimensional space so that a virtual shooting point from which the aiming direction heads toward said target object is set at the converted positional coordinates off the virtual viewpoint, which is set at the location as in (b), in the virtual three-dimensional space; and (e) determine if the converted aiming direction extending from said shooting point hits said target object.

11. The game device according to claim 10, wherein said plurality of detection means comprises four sensor means which are arranged at the corners of the display.

12. The game device according to claim 10, wherein said plurality of detection means comprises at least two sensor means each having three detection planes disposed toward three mutually different directions.

13. The game device according to claim 10, wherein said information processing device is further configured to:
(f) change the virtual viewpoint to a point on a virtual line along which said converted aiming direction extends so that a scene is displayed in which said target object and said background objects are viewed.

14. An image generation method executable on a game device provided with operational means having radiation means which radiates a detectable wave, information processing means which controls progress of a game in response to operation by a player on the operational means, and a plurality of detection means disposed at mutually different positions along peripheries of a monitor display and each configured to detect intensity components of said detectable wave separately from each other, said method comprising the steps of:
(a) calculating, using said information processing means, a scene including a target object and an obstacle object arranged in a virtual three-dimensional space;
(b) generating, using said information processing means, a two-dimensional game scene image viewing the three-dimensional space from a virtual viewpoint for displaying the scene on said monitor display, wherein said target object is located behind said obstacle object when viewed from the virtual viewpoint;
(c) calculating, using said information processing means, positional coordinates and an aiming direction of said operational means in a three-dimensional real space in front of said monitor display based on ratios of the intensity components of said detectable wave detected by said plurality of detection means at said different positions;
(d) converting, using said information processing means, while the virtual viewpoint remains as set in (b), the calculated positional coordinates and the calculated aiming direction of said operational means into positional coordinates and an aiming in the virtual three-dimensional space so that a virtual shooting point from which the aiming direction heads toward said target object is set at the converted positional coordinates off the virtual viewpoint, which is set at the location as in (b), in the virtual three-dimensional space; and
(e) determining, using said information processing means, if the converted aiming direction extending from said shooting point hits said target object.

15. The image generation method according to claim 14, wherein each of said plurality of detection means disposed at said different positions is provided with three detection planes arranged toward three mutually different directions, to provide said intensity components of said detectable wave.

16. The image generation method according to claim 14, further comprising the step of changing the state of said detectable wave so as to contain the content of said operational instruction input with said operational means.

17. The image generation method according to claim 14, further comprising one of steps selected from a step of changing a state of said target object and a step of changing a position and visual direction of said virtual viewpoint according to a calculation result at said step (c).

18. The image generation method according to claim 14 wherein said game device is provided with a plurality of the operational means, the method further comprising the step of:
transmitting an identifying signal for selecting one of said plurality of operational means in each prescribed timing and identifying the selected operational means; and
allowing only the selected operational means to transmit the detectable wave in response to said identifying signal.

19. The image generation method according to claim 14, further comprising the step of:
variably setting characteristics of said detectable wave such that the operational means is identifiable from another operational means so that the operational means is selectively identified for calculation at the step (c).

20. The image generation method according to claim 14, wherein said method further performs the step of:
(f) changing the virtual viewpoint to a point on a virtual line along which said converted aiming direction extends so that a scene is displayed in which said target object and said obstacle objects are viewed.

21. A simulation apparatus, comprising:
an information processing device;
a monitor display connected to said information processing device;
operational means connected to said information processing device, configured to generate operational instructions in response to operations by a player, wherein the operational instructions configure said operational means to move in three-dimensional directions in a real space in front of said monitor display; and
detection means configured to detect a three-dimensional position and an aiming direction of said operational means held by the player in the real space in front of said monitor display,
wherein said information processing device is configured to:
calculate a game scene including a target object and an obstacle object in a virtual three-dimensional game space;
display the game scene viewed from a virtual viewpoint on the monitor display so that the target object is located behind the obstacle object when viewed from the virtual viewpoint;
convert, while the virtual viewpoint remains at the location in the display of the game scene, calculated positional coordinates and a calculated aiming direction in the real space of the operational means into positional coordinates and an aiming direction in the virtual three-dimensional game space so that a virtual shooting point aiming at said target object along the aiming direction is set at the converted positional coordinates off the virtual viewpoint, which is set at the location in the display of the game scene, in the virtual three-dimensional space; and
determine if the aiming direction of the operational means in the real space hits the target object.

22. A simulation apparatus according to claim 21, wherein said information processing device is further configured to:
change the virtual viewpoint to a point on a virtual line along which said converted aiming direction extends so that a scene is displayed in which said target object and said obstacle object are viewed.

* * * * *